United States Patent
Suzuki et al.

(10) Patent No.: US 10,353,184 B2
(45) Date of Patent: Jul. 16, 2019

(54) ZOOM LENS SYSTEM, IMAGING APPARATUS AND CAMERA

(71) Applicant: Panasonic Intellectual Property Management Co., Ltd., Osaka (JP)

(72) Inventors: Yasuto Suzuki, Osaka (JP); Genki Nakazawa, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 37 days.

(21) Appl. No.: 15/682,547

(22) Filed: Aug. 22, 2017

(65) Prior Publication Data

US 2018/0074301 A1   Mar. 15, 2018

(30) Foreign Application Priority Data

Sep. 14, 2016   (JP) ................... 2016-179069

(51) Int. Cl.
*G02B 15/163*   (2006.01)
*G02B 15/17*   (2006.01)

(52) U.S. Cl.
CPC ........... *G02B 15/163* (2013.01); *G02B 15/17* (2013.01)

(58) Field of Classification Search
CPC ............................ G02B 15/163; G02B 15/17
See application file for complete search history.

(56) References Cited

U.S. PATENT DOCUMENTS

| 5,642,224 A | 6/1997 | Suzuki |
| 6,246,519 B1 | 6/2001 | Suzuki |
| 2009/0251779 A1 | 10/2009 | Adachi et al. |

FOREIGN PATENT DOCUMENTS

| JP | 6-337375 | 12/1994 |
| JP | 8-005920 | 1/1996 |
| JP | 2005-284099 | 10/2005 |
| JP | 2009-265653 | 11/2009 |

*Primary Examiner* — Jack Dinh
(74) *Attorney, Agent, or Firm* — Wenderoth Lind & Ponack, L.L.P.

(57) ABSTRACT

A zoom lens system is an optical system that includes, in order from an object side to an image side, a first lens group having one first lens element with positive optical power, a second lens group having one second lens element with negative optical power, a third lens group with negative optical power, and a subsequent lens group including at least two lens groups. When zooming, distances between the lens groups change, and condition: 1.65<|f2|/fw<2.20 (where f2: Focal length of the second lens group, and fw: Focal length of the entire system at a wide-angle end) is satisfied.

9 Claims, 14 Drawing Sheets

ZOOM LENS SYSTEM, IMAGING APPARATUS AND CAMERA

BACKGROUND

1. Technical Field

The present disclosure relates to compact zoom lens systems with good aberrations, and imaging apparatuses employing this zoom lens system.

2. Description of the Related Art

Japanese Patent Unexamined Publication No. 2009-265653 discloses a zoom optical system that includes a first lens group with positive optical power, a second lens group with negative optical power, and at least two subsequent lens groups. These two lens groups include a lens group with positive optical power and a lens group disposed to its image side.

SUMMARY

An object of the present disclosure is to offer a compact zoom lens system, and an imaging apparatus and camera employing this zoom lens system.

The zoom lens system of the present disclosure is an optical system that includes, in order from an object side to an image side, a first lens group having one first lens element with positive optical power, a second lens group having one second lens element with negative optical power, a third lens group with negative optical power, and a subsequent lens group including at least two lens groups. In this optical system, distances between the lens groups change when zooming, and condition (1) below is satisfied.

$$1.65 < |f2|/fw < 2.20 \quad (1)$$

Where
f2: Focal length of the second lens group
fw: Focal length of the entire system at a wide-angle end The present disclosure enables to offer a compact zoom lens system, and an imaging apparatus and camera employing this zoom lens system.

DETAILED DESCRIPTION

Hereinafter, a detailed description is made of some embodiments with reference to the related drawings as appropriate. However, a detailed description more than necessary may be omitted, such as a description of a well-known item and a duplicate description for a substantially identical component, to avoid an unnecessarily redundant description and to allow those skilled in the art to easily understand the following description.

Note that accompanying drawings and the following description are provided for those skilled in the art to well understand the present disclosure and do not intend to limit the subjects described in the claims by the drawings and the description.

First Through Fourth Exemplary Embodiments

FIGS. 1, 4, 7 and 10 are lens layout diagrams of zoom lens systems in the first to fourth exemplary embodiments, respectively. Each figure shows the zoom lens system in an infinity focusing state.

In FIGS. 1, 4, 7 and 10, part (a) shows a lens configuration at a wide-angle end (a state of the shortest focal length: Focal length fW), part (b) shows a lens configuration at an middle position (a state of the middle focal length: Focal length fM=√(fW*fT), and part (c) shows a lens configuration at a telephoto end (a state of the longest focal length: Focal length fT). Parts (a), (b), and (c) have the same aspect ratio.

In addition, in FIGS. 1, 4, 7, and 10, zigzag arrows between parts (a) and (b) are straight lines connecting the positions of the lens groups in each state of the wide-angle end, middle position, and telephoto end, in sequence from the top. Parts between the wide-angle end and the middle position, and between the middle position and the telephoto end are simply connected by straight lines, which is different from actual movement of each lens group.

Furthermore, in FIGS. 1, 4, 7, and 10, arrows on the lens groups indicate focusing from the infinity focusing state to the proximity focusing state. Since a reference mark of each lens group is indicated below the position of each lens group in part (a), an arrow indicating focusing is placed, for the convenience, below this reference mark of each lens group in FIGS. 1, 4, 7, and 10. A movement direction of each lens group on focusing in each zooming state is detailed later in each exemplary embodiment.

In FIGS. 1, 4, 7, and 10, asterisk (*) inscribed on a specific surface represents that the surface is aspheric. Still more, symbol (+) and symbol (−) affixed to the reference mark of each lens group in FIGS. 1, 4, 7, and 10 correspond to a mark of the optical power of each lens group. The straight line at the rightmost in FIGS. 1, 4, 7, and 10 indicates the position of image surface S (a surface of image sensor to the object side).

First Exemplary Embodiment

Figure 1:
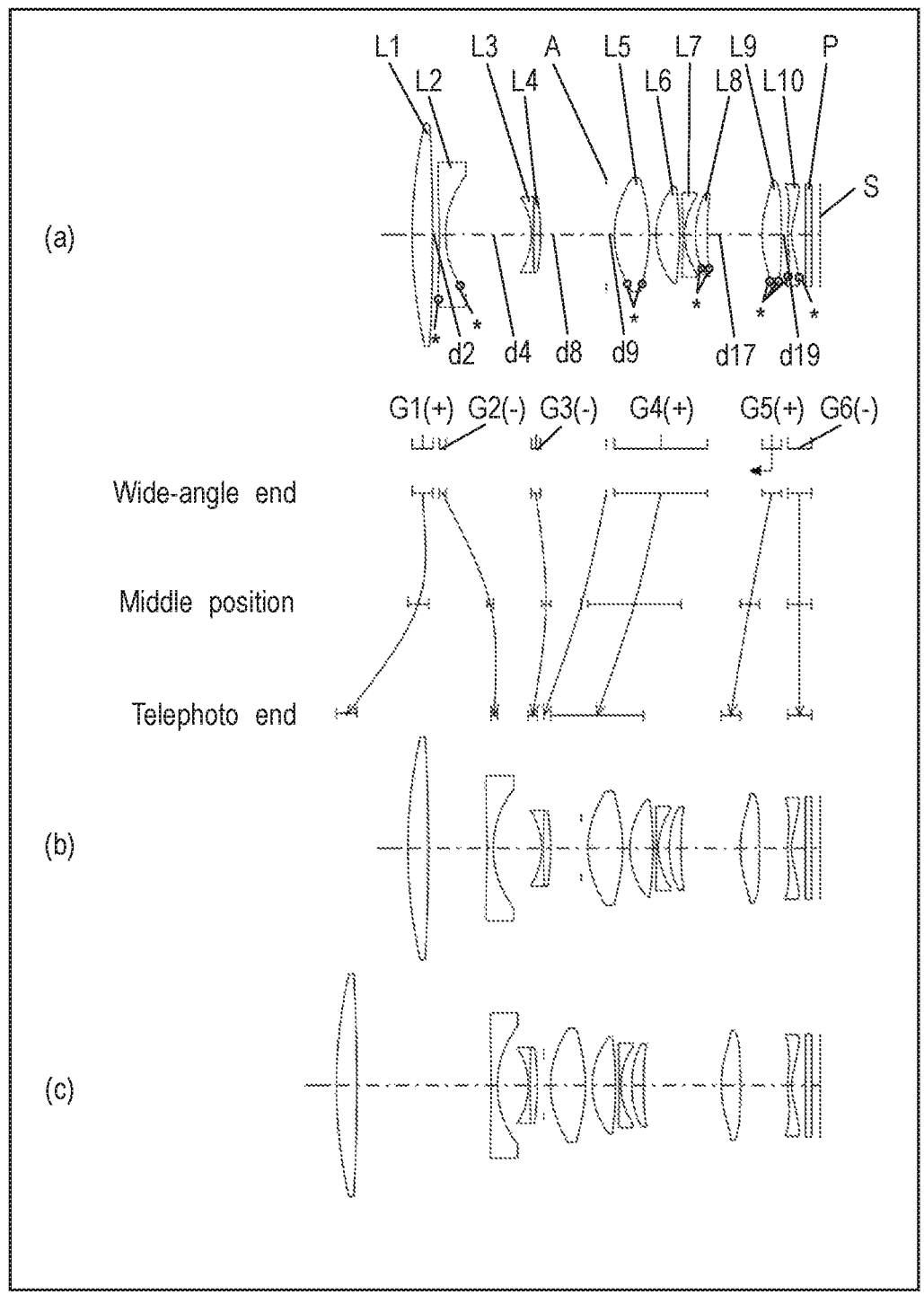
FIG. 1 is a lens layout diagram of a zoom lens system showing an infinity focusing state in accordance with a first exemplary embodiment (numerical practical example 1).
Figure 2:
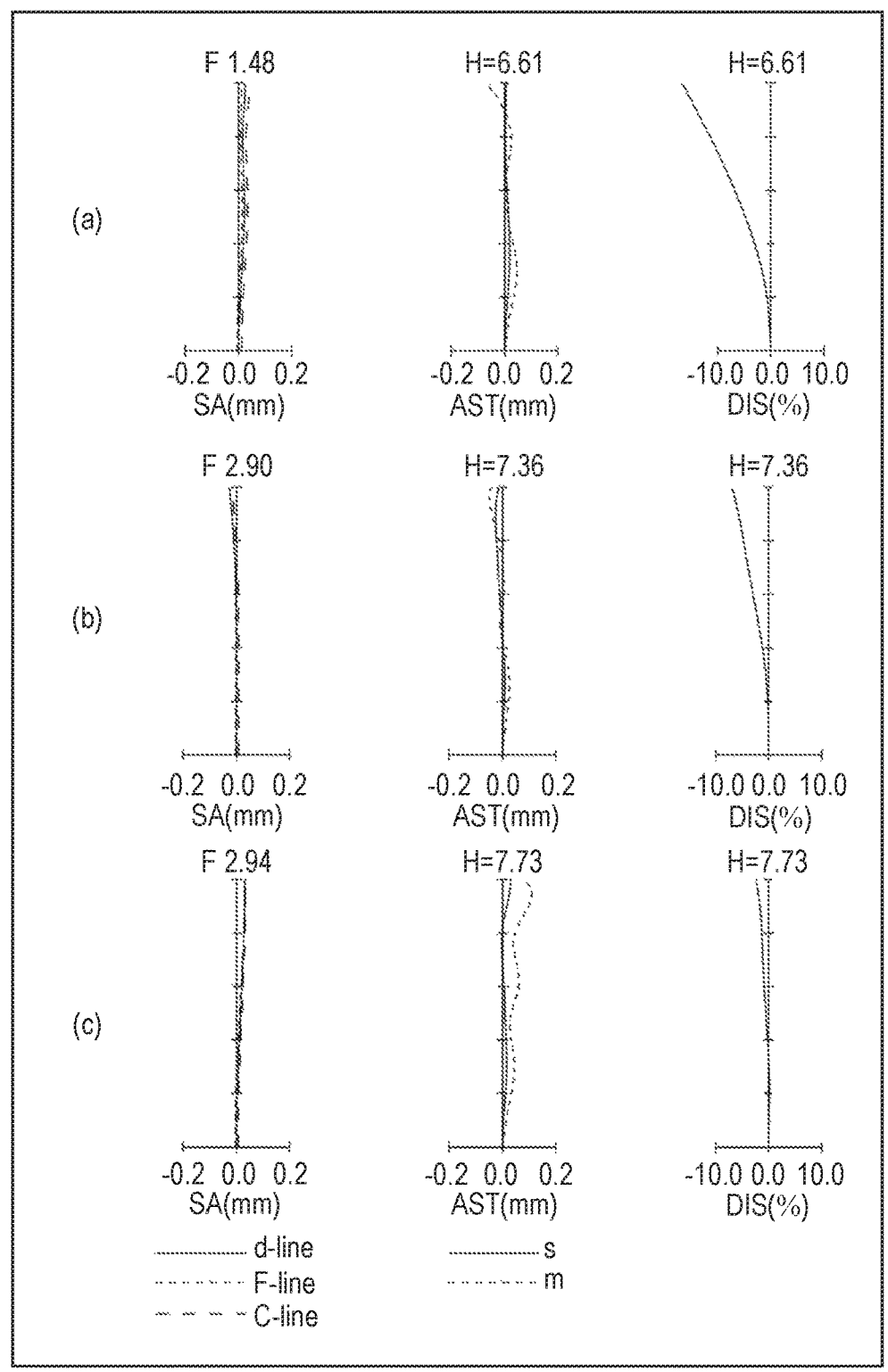
FIG. 2 is a longitudinal aberration diagram of the zoom lens system in the infinity focusing state in accordance with the first exemplary embodiment.
Figure 3:
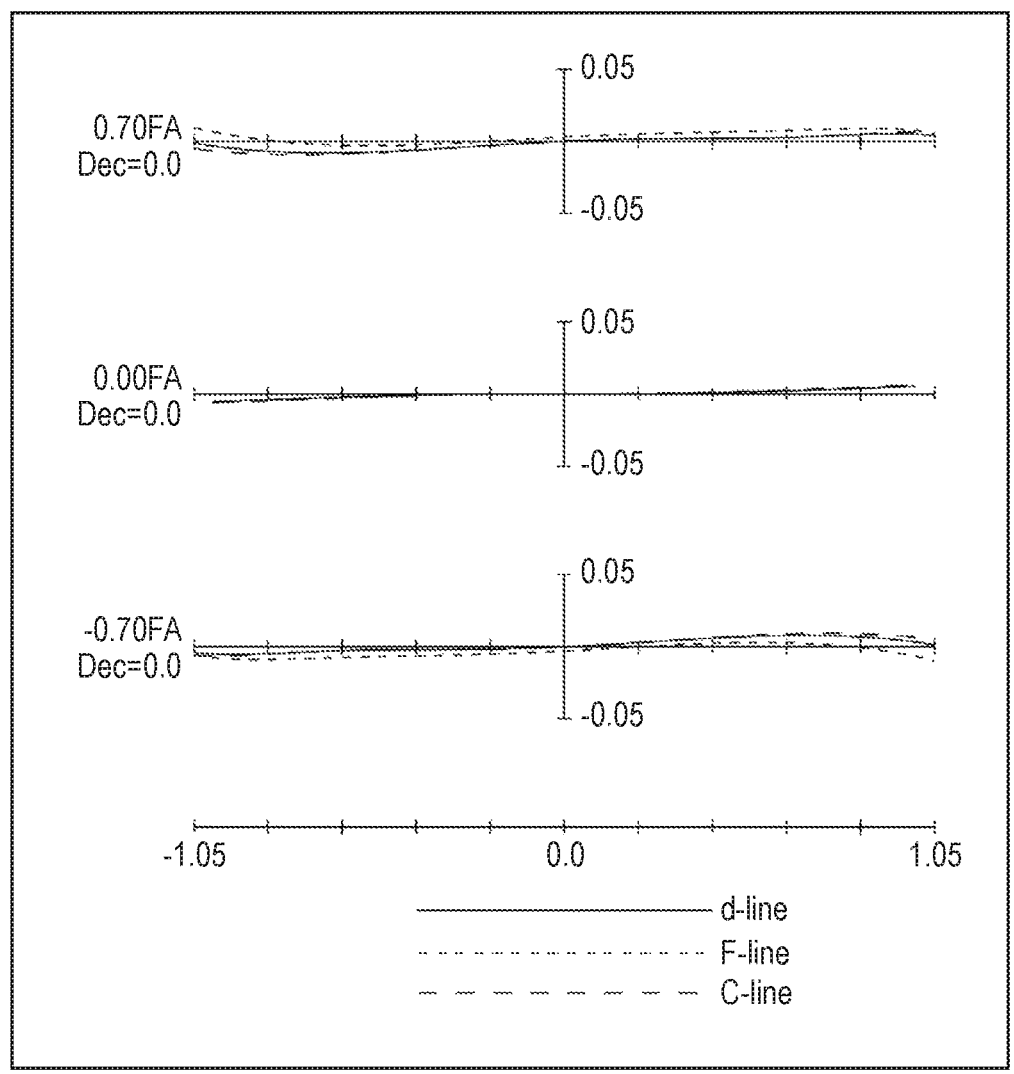
FIG. 3 is a lateral aberration diagram at a telephoto end of the zoom lens system in accordance with the first exemplary embodiment.

FIG. 1 is a zoom lens system in the first exemplary embodiment.

The zoom lens system includes, in order from the object side to the image side, first lens group G1 with positive optical power, second lens group G2 with negative optical power, third lens group G3 with negative optical power, aperture stop A, fourth lens group G4 with positive optical power, fifth lens group G5 with positive optical power, sixth lens group G6 with negative optical power, and parallel flat plate P. Fourth lens group G4, fifth lens group G5, and sixth lens group G6 configure a subsequent lens group.

First lens group G1 includes first lens element L1 with positive optical power.

Second lens group G2 includes second lens element L2 with negative optical power.

Third lens group G3 includes, in order from the object side to the image side, third lens element L3 with negative optical power and fourth lens element L4 with positive optical power. Third lens element L3 and fourth lens element L4 are cemented, typically with adhesive agent, to configure a cemented lens.

Fourth lens group G4 includes, in order from the object side to the image side, fifth lens element L5 with positive optical power, sixth lens element L6 with positive optical power, seventh lens element L7 with negative optical power, and eighth lens element L8 with positive optical power.

Fifth lens group G5 includes ninth lens element L9 with positive optical power.

Sixth lens group G6 includes tenth lens element L10 with negative optical power.

Aperture stop A is placed between fourth lens element L4 and fifth lens element L5.

Each lens element is described below.

The lens element in first lens group G1 is described. First lens element L1 is a biconvex lens.

The lens element in second lens group G2 is described. Second lens element L2 is a biconcave lens, and its surfaces are both aspheric.

The lens elements in third lens group G3 are described. Third lens element L3 is a biconcave lens, and fourth lens element L4 is a biconvex lens.

The lens elements in fourth lens group G4 are described. Fifth lens element L5 is a biconvex lens, and its surfaces are both aspheric. Sixth lens element L6 is a biconvex lens. Seventh lens element L7 is a biconcave lens. Eighth lens element L8 is a meniscus lens with a convex surface facing an object, and its surfaces are both aspheric.

The lens element in fifth lens group G5 is described. Ninth lens element L9 is a biconvex lens, and its surfaces are both aspheric.

The lens element in sixth lens group G6 is described. Tenth lens element L10 is a meniscus lens with a convex surface facing an object, and its surfaces are both aspheric.

In the zoom lens system, when zooming from the wide-angle end to the telephoto end on photographing, first lens group G1 moves making a convex trace to the image side, second lens group G2 moves making a convex trace to the image side, third lens group G3 moves making a convex trace to the image side, aperture stop A moves to the object side, fourth lens group G4 moves to the object side, fifth lens group G5 moves to the object side, and sixth lens group G6 and image surface S do not move. In other words, when zooming, each lens group moves along the optical axis so that a distance between first lens group G1 and second lens group G2 increases, a distance between second lens group G2 and third lens group G3 decreases, a distance between third lens group G3 and aperture stop A decreases, a distance between aperture stop A and fourth lens group G4 decreases, a distance between fourth lens group G4 and fifth lens group G5 increases, and a distance between fifth lens group G5 and sixth lens group G6 increases. In addition, as shown in FIG. 1, when zooming from the wide-angle end to the telephoto end, an aperture stop diameter of aperture stop A becomes smaller at the middle position compared to that at the wide-angle end, and becomes larger at the telephoto end compared to that at the middle position.

In the zoom lens system, fifth lens group G5 moves along the optical axis to the object side, as shown by arrow G5 in FIG. 1, when focusing from the infinity focusing state to the proximity focusing state.

Second Exemplary Embodiment

Figure 4:
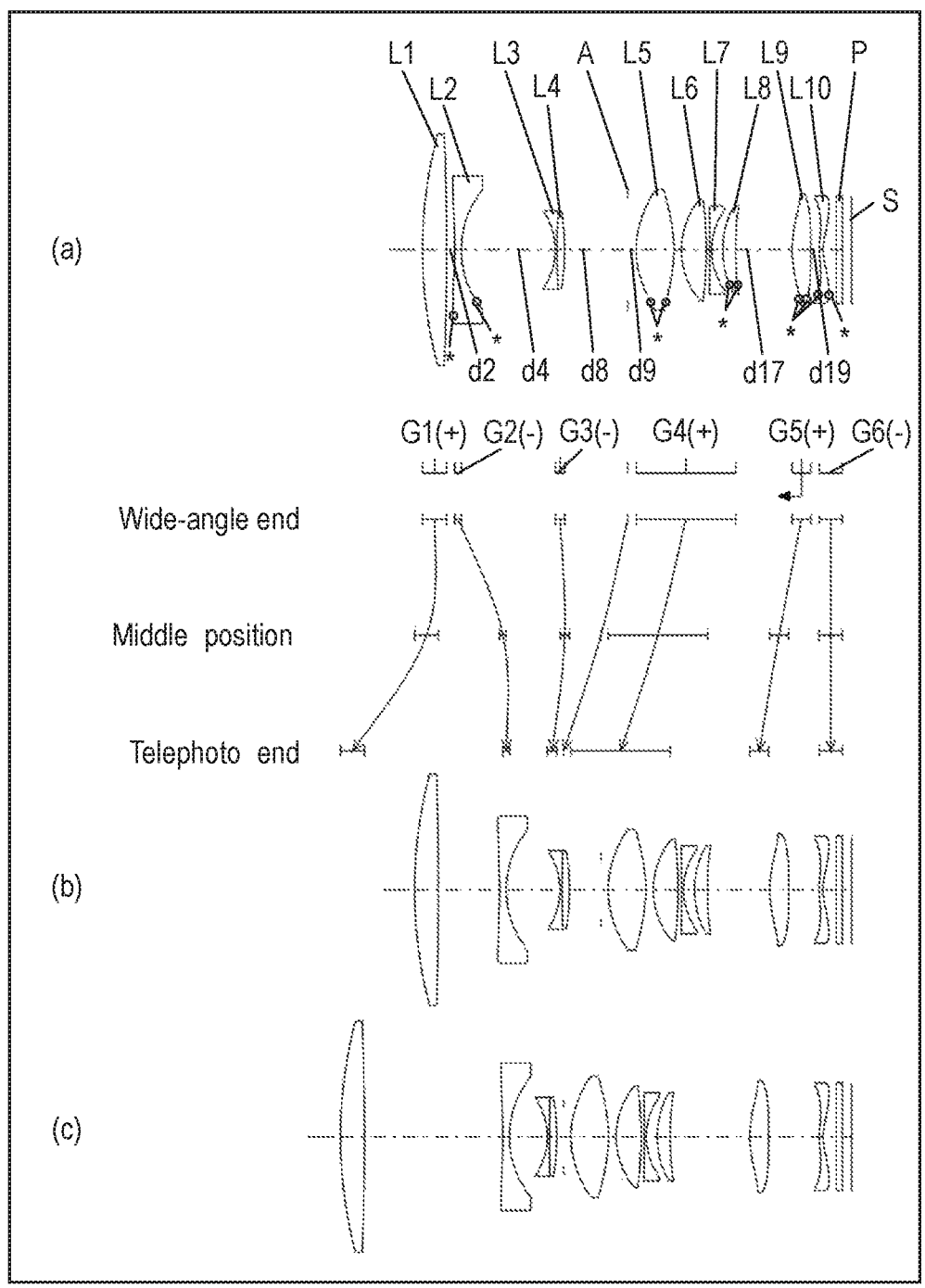
FIG. 4 is a lens layout diagram of a zoom lens system showing an infinity focusing state in accordance with a second exemplary embodiment (numerical practical example 2).
Figure 5:
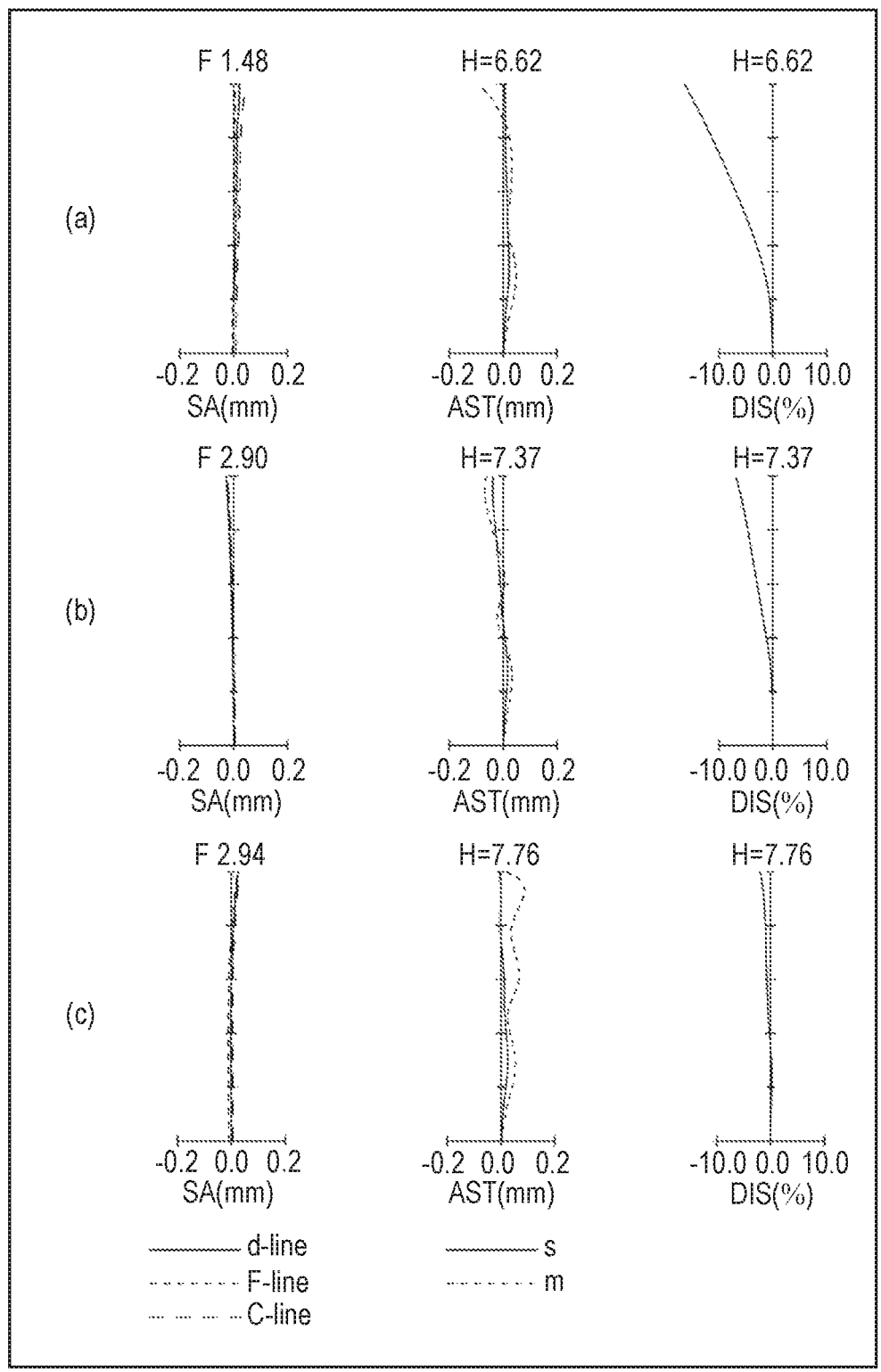
FIG. 5 is a longitudinal aberration diagram of the zoom lens system in the infinity focusing state in accordance with the second exemplary embodiment.
Figure 6:
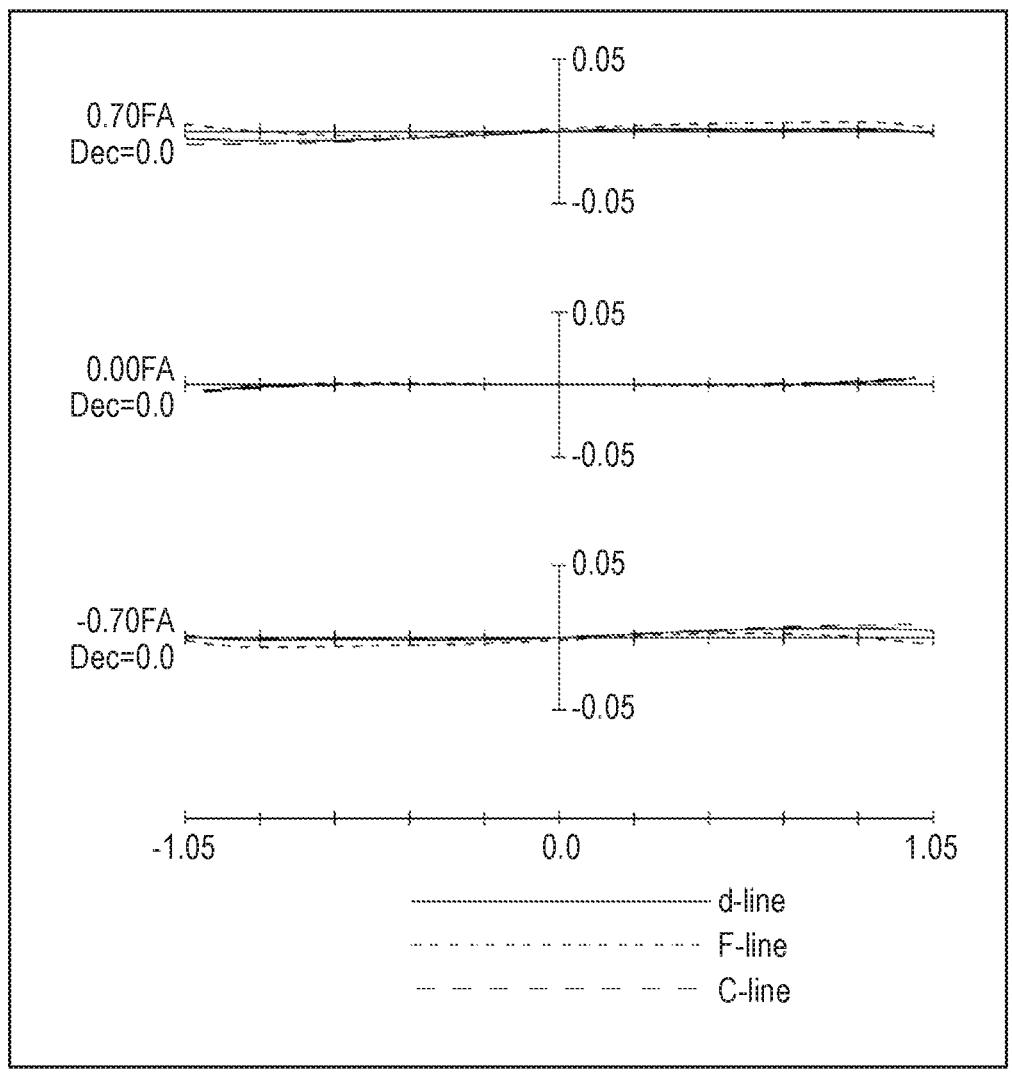
FIG. 6 is a lateral aberration diagram at a telephoto end of the zoom lens system in accordance with the second exemplary embodiment.

FIG. 4 is a zoom lens system in the second exemplary embodiment.

The zoom lens system includes, in order from the object side to the image side, first lens group G1 with positive optical power, second lens group G2 with negative optical power, third lens group G3 with negative optical power, aperture stop A, fourth lens group G4 with positive optical power, fifth lens group G5 with positive optical power, sixth lens group G6 with negative optical power, and parallel flat plate P. Fourth lens group G4, fifth lens group G5, and sixth lens group G6 configure a subsequent lens group.

First lens group G1 includes first lens element L1 with positive optical power.

Second lens group G2 includes second lens element L2 with negative optical power.

Third lens group G3 includes, in order from the object side and to the image side, third lens element L3 with negative optical power, and fourth lens element L4 with positive optical power. Third lens element L3 and fourth lens element L4 are cemented, typically with adhesive agent, to configure a cemented lens.

Fourth lens group G4 includes, in order from the object side to the image side, fifth lens element L5 with positive optical power, sixth lens element L6 with positive optical power, seventh lens element L7 with negative optical power, and eighth lens element L8 with positive optical power.

Fifth lens group G5 includes ninth lens element L9 with positive optical power.

Sixth lens group G6 includes tenth lens element L10 with negative optical power.

Aperture stop A is placed between fourth lens element L4 and fifth lens element L5.

Each lens element is described below.

The lens element in first lens group G1 is described. First lens element L1 is a biconvex lens.

The lens element in second lens group G2 is described. Second lens element L2 is a biconcave lens, and its surfaces are both aspheric.

The lens elements in third lens group G3 are described. Third lens element L3 is a biconcave lens, and fourth lens element L4 is a biconvex lens.

The lens elements in fourth lens group G4 are described. Fifth lens element L5 is a biconvex lens, and its surfaces are both aspheric. Sixth lens element L6 is a biconvex lens. Seventh lens element L7 is a biconcave lens. Eighth lens element L8 is a meniscus lens with a convex surface facing an object, and its surfaces are both aspheric.

The lens element in fifth lens group G5 is described. Ninth lens element L9 is a biconvex lens, and its surfaces are both aspheric.

The lens element in sixth lens group G6 is described. Tenth lens element L10 is a meniscus lens with a convex surface facing an object, and its surfaces are both aspheric.

In the zoom lens system, when zooming from the wide-angle end to the telephoto end on photographing, first lens group G1 moves making a convex trace to the image side, second lens group G2 moves making a convex trace to the image side, third lens group G3 moves making a convex trace to the image side, aperture stop A moves to the object side, fourth lens group G4 moves to the object side, fifth lens group G5 moves to the object side, and sixth lens group G6 and image surface S do not move. In other words, when zooming, each lens group moves along the optical axis so that a distance between first lens group G1 and second lens group G2 increases, a distance between second lens group G2 and third lens group G3 decreases, a distance between third lens group G3 and aperture stop A decreases, a distance between aperture stop A and fourth lens group G4 decreases, a distance between fourth lens group G4 and fifth lens group G5 increases, and a distance between fifth lens group G5 and sixth lens group G6 increases. In addition, as shown in FIG. 4, when zooming from the wide-angle end to the telephoto end, an aperture stop diameter of aperture stop A becomes smaller at the middle position compared to that at the wide-angle end, and becomes larger at the telephoto end compared to that at the middle position.

In the zoom lens system, fifth lens group G5 moves along the optical axis to the object side, as shown by arrow G5 in FIG. 4, when focusing from the infinity focusing state to the proximity focusing state.

Third Exemplary Embodiment

Figure 7:
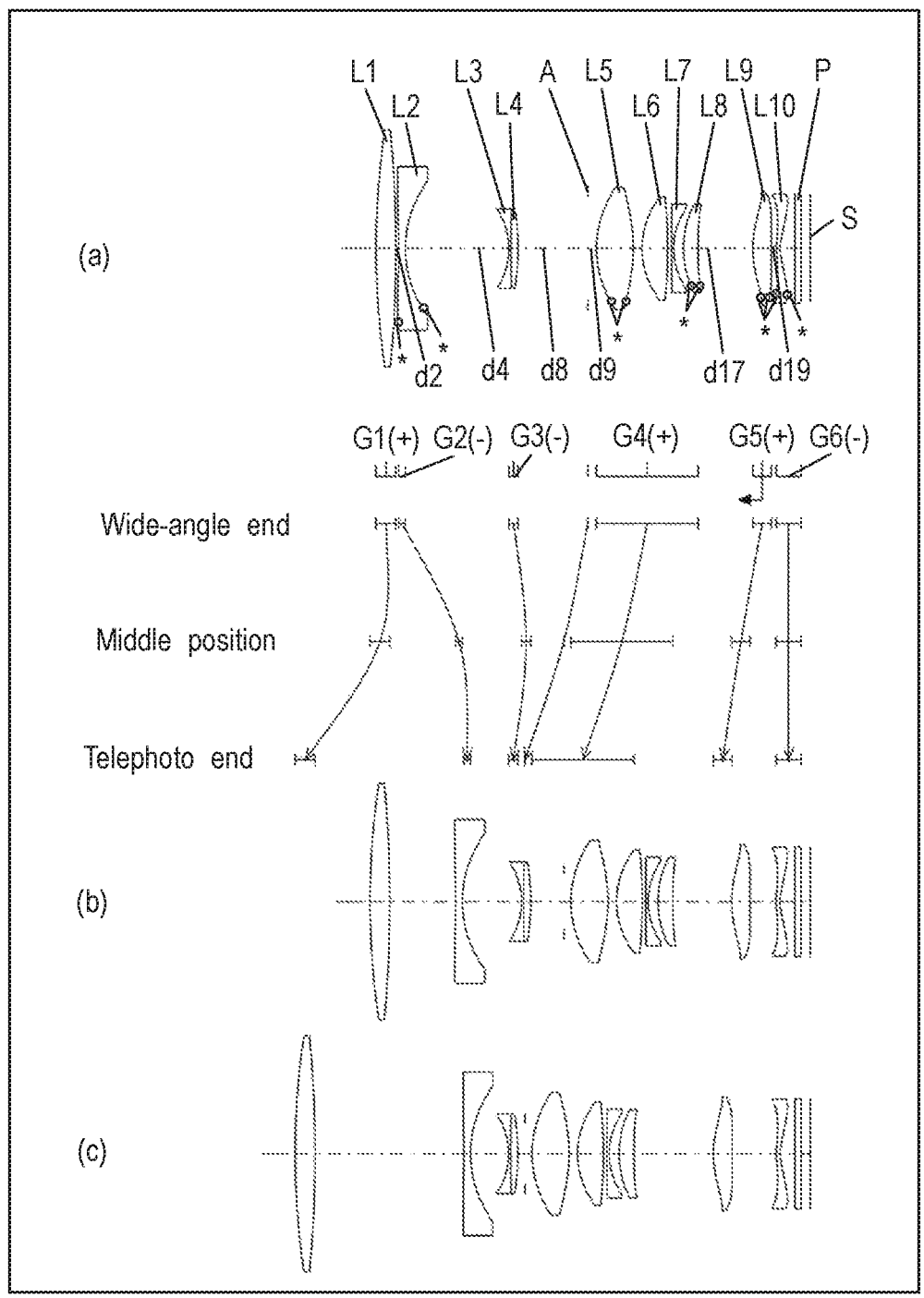
FIG. 7 is a lens layout diagram of a zoom lens system showing an infinity focusing state in accordance with a third exemplary embodiment (numerical practical example 3).
Figure 8:
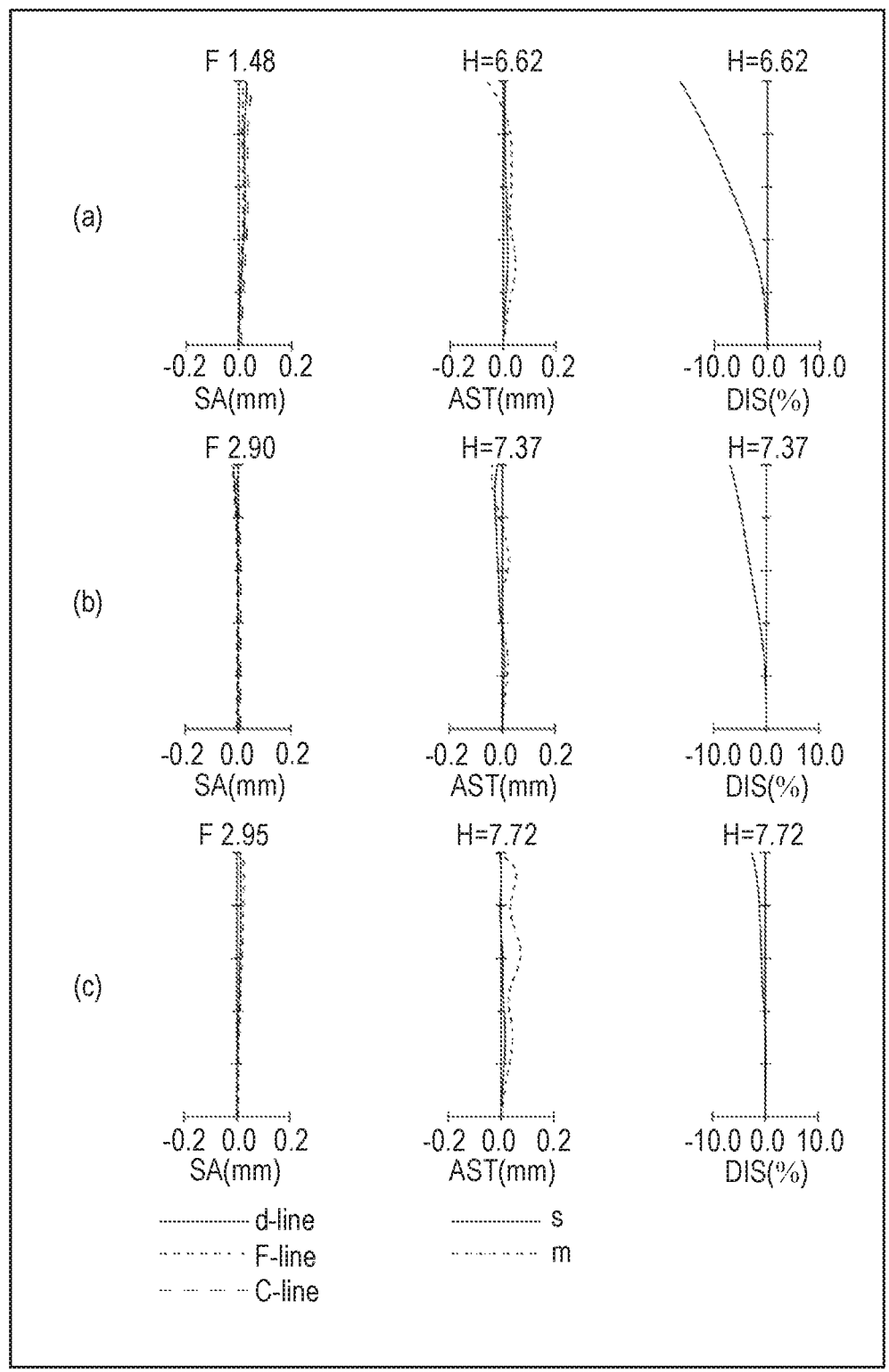
FIG. 8 is a longitudinal aberration diagram of the zoom lens system in the infinity focusing state in accordance with the third exemplary embodiment.
Figure 9:
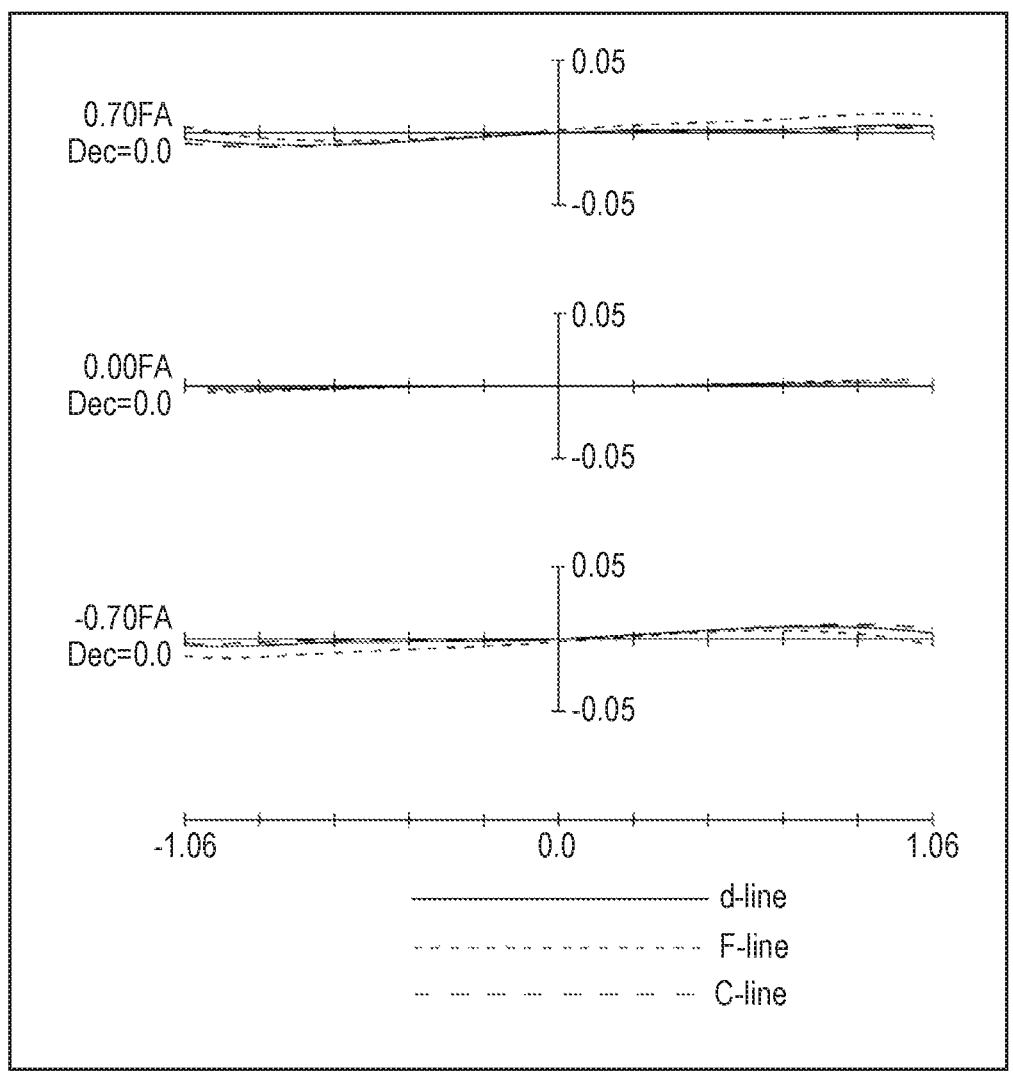
FIG. 9 is a lateral aberration diagram at a telephoto end of the zoom lens system in accordance with the third exemplary embodiment.

FIG. 7 is a zoom lens system in the third exemplary embodiment.

The zoom lens system includes, in order from the object side to the image side, first lens group G1 with positive optical power, second lens group G2 with negative optical power, third lens group G3 with negative optical power, aperture stop A, fourth lens group G4 with positive optical power, fifth lens group G5 with positive optical power, sixth lens group G6 with negative optical power, and parallel flat plate P. Fourth lens group G4, fifth lens group G5, and sixth lens group CG configure a subsequent lens group.

First lens group G1 includes first lens element L1 with positive optical power.

Second lens group G2 includes second lens element L2 with negative optical power.

Third lens group G3 includes, in order from the object side and to the image side, third lens element L3 with negative optical power, and fourth lens element L4 with positive optical power. Third lens element L3 and fourth lens element L4 are cemented, typically with adhesive agent, to configure a cemented lens.

Fourth lens group G4 includes, in order from the object side to the image side, fifth lens element L5 with positive optical power, sixth lens element L6 with positive optical power, seventh lens element L7 with negative optical power, and eighth lens element L8 with positive optical power.

Fifth lens group G5 includes ninth lens element L9 with positive optical power.

Sixth lens group G6 includes tenth lens element L10 with negative optical power.

Aperture stop A is placed between fourth lens element L4 and fifth lens element L5.

Each lens element is described below.

The lens element in first lens group G1 is described. First lens element L1 is a biconvex lens.

The lens element in second lens group G2 is described. Second lens element L2 is a biconcave lens, and its surfaces are both aspheric.

The lens elements in third lens group G3 are described. Third lens element L3 is a biconcave lens, and fourth lens element L4 is a biconvex lens.

The lens elements in fourth lens group G4 are described. Fifth lens element L5 is a biconvex lens, and its surfaces are both aspheric. Sixth lens element L6 is a biconvex lens. Seventh lens element L7 is a meniscus lens with a convex surface facing an object. Eighth lens element L8 is a meniscus lens with a convex surface facing an object, and its surfaces are both aspheric.

The lens element in fifth lens group G5 is described. Ninth lens element L9 is a meniscus lens with a convex surface facing an object, and its surfaces are both aspheric.

The lens element in sixth lens group G6 is described. Tenth lens element L10 is a meniscus lens with a convex surface facing an object, and its surfaces are both aspheric.

In the zoom lens system, when zooming from the wide-angle end to the telephoto end on photographing, first lens group G1 moves making a convex trace to the image side, second lens group G2 moves making a convex trace to the image side, third lens group G3 moves making a convex trace to the image side, aperture stop A moves to the object side, fourth lens group G4 moves to the object side, fifth lens group G5 moves to the object side, and sixth lens group G6 and image surface S do not move. In other words, when zooming, each lens group moves along the optical axis so that a distance between first lens group G1 and second lens group G2 increases, a distance between second lens group G2 and third lens group G3 decreases, a distance between third lens group G3 and aperture stop A decreases, a distance between aperture stop A and fourth lens group G4 decreases, a distance between fourth lens group G4 and fifth lens group G5 increases, and a distance between fifth lens group G5 and sixth lens group G6 increases. In addition, as shown in FIG. 7, when zooming from the wide-angle end to the telephoto end, an aperture stop diameter of aperture stop A becomes smaller at the middle position compared to that at the wide-angle end, and becomes larger at the telephoto end compared to that at the middle position.

In the zoom lens system, fifth lens group G5 moves along the optical axis to the object side, as shown by arrow G5 in FIG. 7, when focusing from the infinity focusing state to the proximity focusing state.

Fourth Exemplary Embodiment

Figure 10:
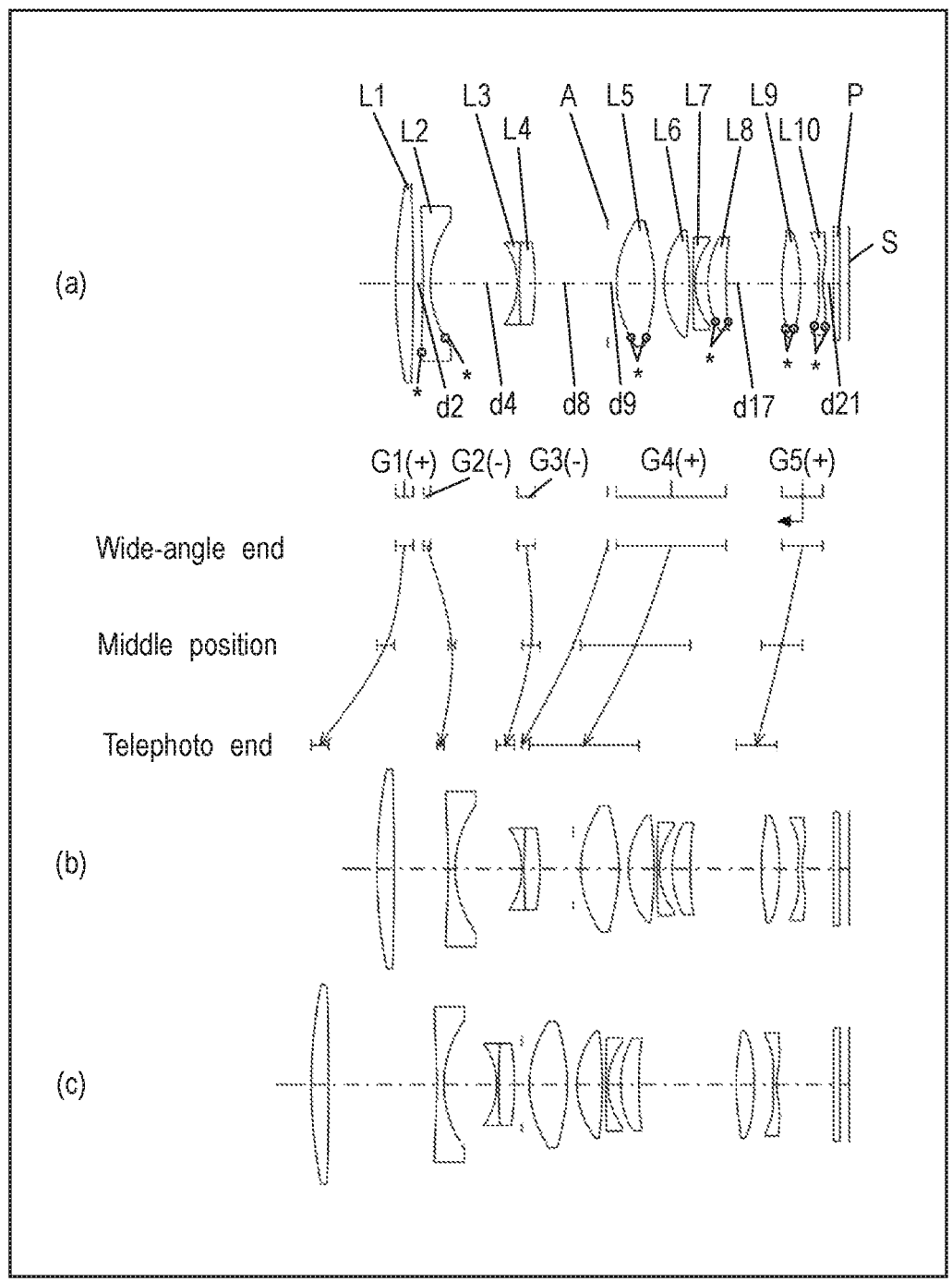
FIG. 10 is a lens layout diagram of a zoom lens system showing an infinity focusing state in accordance with a fourth exemplary embodiment (numerical practical example 4).
Figure 11:
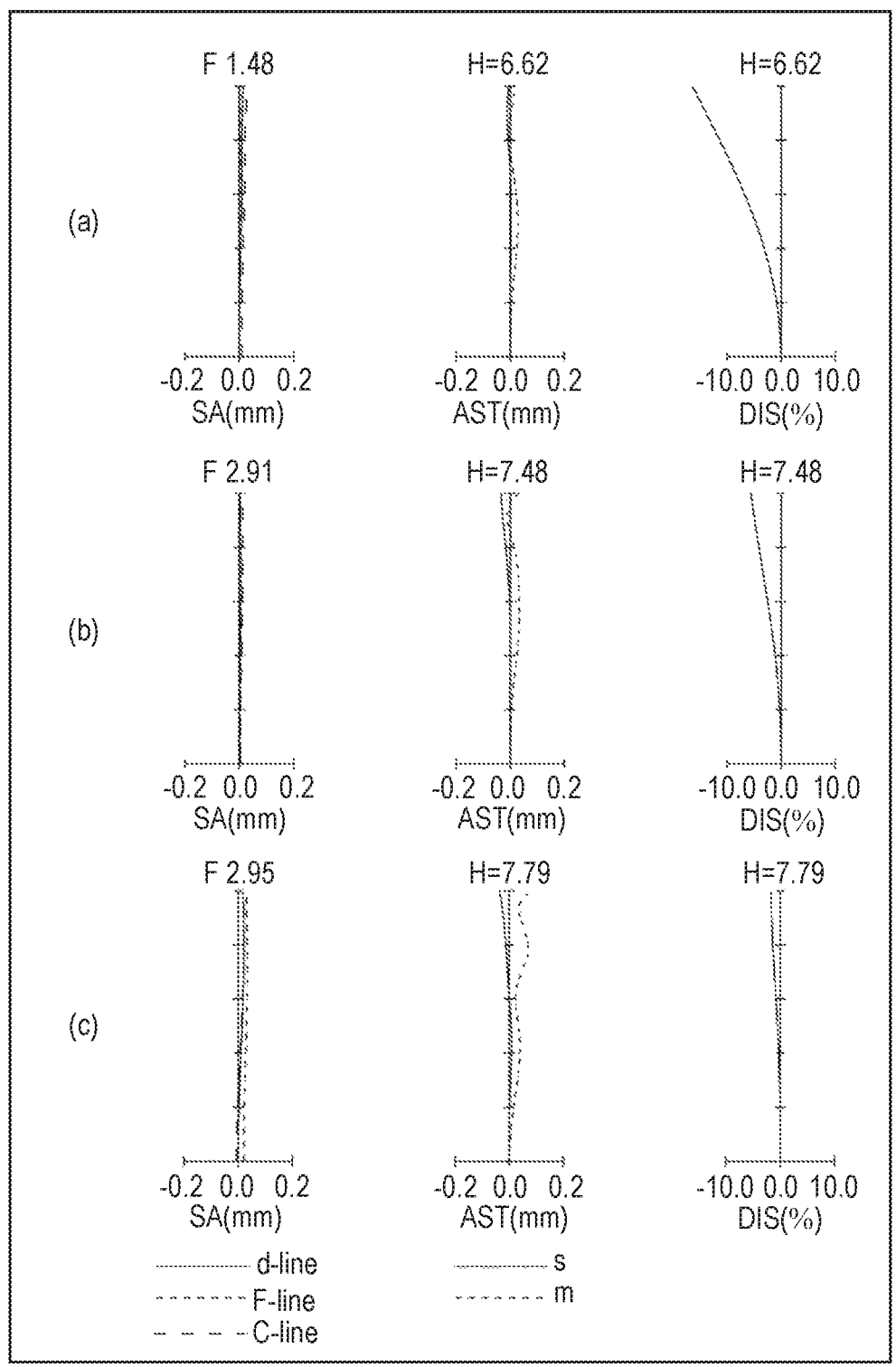
FIG. 11 is a longitudinal aberration diagram of the zoom lens system in the infinity focusing state in accordance with the fourth exemplary embodiment.
Figure 12:
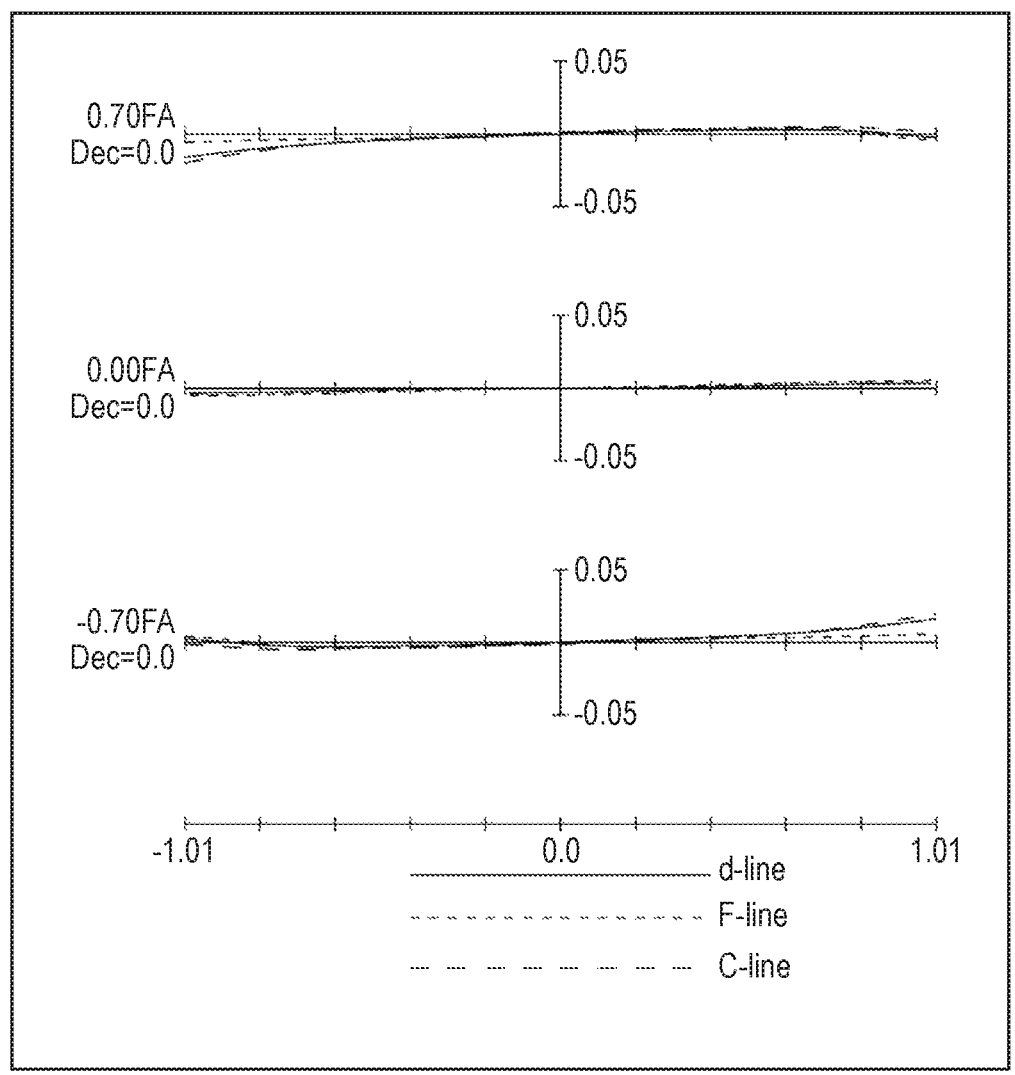
FIG. 12 is a lateral aberration diagram at a telephoto end of the zoom lens system in accordance with the fourth exemplary embodiment.

FIG. 10 is a zoom lens system in the fourth exemplary embodiment.

The zoom lens system includes, in order from the object side to the image side, first lens group G1 with positive optical power, second lens group G2 with negative optical power, third lens group G3 with negative optical power, aperture stop A, fourth lens group G4 with positive optical power, fifth lens group G5 with positive optical power, and parallel flat plate P. Fourth lens group G4 and fifth lens group G5 configure a subsequent lens group.

First lens group G1 includes first lens element L1 with positive optical power.

Second lens group G2 includes second lens element L2 with negative optical power.

Third lens group G3 includes, in order from the object side and to the image side, third lens element L3 with negative optical power, and fourth lens element L4 with positive optical power. Third lens element L3 and fourth lens element L4 are cemented, typically with adhesive agent, to configure a cemented lens.

Fourth lens group G4 includes, in order from the object side to the image side, fifth lens element L5 with positive optical power, sixth lens element L6 with positive optical power, seventh lens element L7 with negative optical power, and eighth lens element L8 with positive optical power.

Fifth lens group G5 includes ninth lens element L9 with positive optical power, and tenth lens element L10 with negative optical power.

Aperture stop A is placed between fourth lens element L4 and fifth lens element L5.

Each lens element is described below.

The lens element in first lens group G1 is described. First lens element L1 is a biconvex lens.

The lens element in second lens group G2 is described. Second lens element L2 is a biconcave lens, and its surfaces are both aspheric.

The lens elements in third lens group G3 are described. Third lens element L3 is a biconcave lens, and fourth lens element L4 is a biconvex lens.

The lens elements in fourth lens group G4 are described. Fifth lens element L5 is a biconvex lens, and its surfaces are both aspheric. Sixth lens element L6 is a biconvex lens. Seventh lens element L7 is a meniscus lens with a convex surface facing an object. Eighth lens element L8 is a meniscus lens with a convex surface facing an object, and its surfaces are both aspheric.

The lens elements in fifth lens group G5 are described. Ninth lens element L9 is a biconcave lens, and its surfaces are both aspheric. Tenth lens element L10 is a meniscus lens with a convex surface facing an object, and its surfaces are both aspheric.

In the zoom lens system, when zooming from the wide-angle end to the telephoto end on photographing, first lens group G1 moves to the object side, second lens group G2 moves making a convex trace to the image side, third lens group G3 moves making a convex trace to the image side, aperture stop A moves to the object side, fourth lens group G4 moves to the object side, fifth lens group G5 moves to the object side, and image surface S does not move. In other words, when zooming, each lens group moves along the optical axis so that a distance between first lens group G1 and second lens group G2 increases, a distance between second lens group G2 and third lens group G3 decreases, a distance between third lens group G3 and aperture stop A decreases, a distance between aperture stop A and fourth lens group G4 decreases, and a distance between fourth lens group G4 and fifth lens group G5 increases. In addition, as shown in FIG. 10, when zooming from the wide-angle end to the telephoto end, an aperture stop diameter of aperture stop A becomes smaller at the middle position compared to that at the wide-angle end, and becomes larger at the telephoto end compared to that at the middle position.

In the zoom lens system, fifth lens group G5 moves along the optical axis to the object side, as shown by arrow G5 in FIG. 10, when focusing from the infinity focusing state to the proximity focusing state.

Other Exemplary Embodiments

The first to fourth exemplary embodiments are described above to exemplify the technology disclosed in the present disclosure. The technology of the present disclosure, however, is not limited to these embodiments, but is applicable to other embodiments appropriately devised through modification, substitution, addition, omission, and so on.

Conditions and Advantages

Hereinafter, conditions that a zoom lens system, such as zoom lens systems in the first to fourth exemplary embodiments, can satisfy are described. Multiple feasible conditions are specified for the zoom lens systems in the first to fourth exemplary embodiments. A configuration of zoom lens system that satisfies all these multiple conditions is most preferable. However, by satisfying an individual condition, a zoom lens system that provides a corresponding advantage may be achieved.

The zoom lens system includes, in order from the object side to the image side, first lens group G1 having one lens element with positive optical power, second lens group G2 having one lens element with negative optical power, third lens group G3 with negative optical power, and a subsequent lens group having at least two lens groups.

For example, the zoom lens system preferably satisfies condition (1) below.

$$1.60 < |f2|/fw < 2.20 \qquad (1)$$

Where f2: Focal length of second lens group G2 fw: Focal length of the entire system at the wide-angle end

Specific numeric values for the focal length of second lens group G2 are indicated later in data of zoom lens groups in Table 3C, Table 6C, Table 9C, and Table 12C in first to fourth numerical practical examples. Specific numeric values for the focal length of the entire system at the wide-angle end are indicated later in Various Data shown in Table 3A, Table 6A, Table 9A, and Table 12A in first to fourth numerical practical examples.

First lens group G1 and second lens group G2 are configured with one lens element, and thus the overall optical length can be made compact.

Condition (1) is a condition for specifying a ratio of an absolute value of the focal length of second lens group G2 to the focal length of the entire system at the wide-angle end. When the ratio exceeds the upper limit of condition (1), the overall optical length at the telephoto end becomes too large as a moving distance of second lens group G2 increases on zooming. This makes it difficult to offer a compact zoom lens system. On the other hand, when the ratio exceeds the lower limit of condition (1), it becomes difficult to correct aberrations over the entire system, resulting in inability to secure desired optical performance.

The above advantage can be further enhanced by preferably satisfying condition (1a) or condition (1b).

$$1.70 < |f2|/fw \qquad (1a)$$

$$|f2|/fw < 2.15 \qquad (1b)$$

The above advantage can be still further enhanced by further preferably satisfying condition (1c) or condition (1d).

$$1.75 < |f2|/fw \quad (1c)$$

$$|f2|/fw < 2.10 \quad (1d)$$

Still more, for example, the zoom lens system preferably satisfies condition (2) below.

$$1.60 < nd2 < 2.10 \quad (2)$$

Where nd2: Refractive index at d-line of second lens group G2

Specific numeric values for refractive index at d-line of second lens group G2 are shown later as refractive index nd at d-line in surface data shown in Table 1, Table 4, Table 7, and Table 10 in numerical practical examples 1 to 4.

Condition (2) is a condition for specifying the refractive index at d-line of the second lens group. When the value exceeds the lower limit of condition (2), the overall optical length at the telephoto end becomes too long as a moving distance of second lens group G2 increases on zooming. This makes it difficult to offer a compact lens barrel, imaging apparatus, or camera. On the other hand, when the value exceeds the upper limit of condition (2), aberration occurs over the entire system, and suppression of image surface curvature becomes particularly difficult, resulting in inability to secure desired optical performance.

The above advantage can be further enhanced by preferably satisfying condition (2a) or condition (2b).

$$1.70 < nd2 \quad (2a)$$

$$nd2 < 2.00 \quad (2b)$$

The above advantage can be still further enhanced by further preferably satisfying condition (2c) or condition (2d).

$$1.80 < nd2 \quad (2c)$$

$$nd2 < 1.90 \quad (2d)$$

Still more, for example, the zoom lens system preferably satisfies condition (3) below.

$$60 < (vda + vdb)/2 \quad (3)$$

Where vda: Largest Abbe number in the lens elements of the subsequent lens group vdb: Second largest Abbe number in the lens elements of the subsequent lens group Specific numeric values for the largest Abbe number in the lens elements of the subsequent lens group and the second largest Abbe number in the lens elements of the subsequent lens group are indicated later as Abbe number vd at d-line in surface data shown in Table 1, Table 4, Table 7, and Table 10 in numerical practical examples 1 to 4.

Condition (3) is a condition for specifying the Abbe number of the lens elements in the subsequent lens group. When the value exceeds the lower limit of condition (3), chromatic aberration from the wide-angle end to the telephoto end, in particular axial chromatic aberration, cannot be satisfactorily corrected.

The above advantage can be further enhanced by preferably satisfying condition (3a).

$$65 < (vda + vdb)/2 \quad (3a)$$

The above advantage can be still further enhanced by further preferably satisfying condition (3b).

$$70 < (vda + vdb)/2 \quad (3b)$$

Still more, for example, the zoom lens system preferably satisfies condition (4) below.

$$5.50 < |f3|/fw < 7.20 \quad (4)$$

Where f3: Focal distance of third lens group G3

Specific numeric values for the focal length of third lens group G3 are indicated later in data for the zoom lens groups shown in Table 3C, Table 6C, Table 9C, and Table 12C in numerical practical examples 1 to 4.

Condition (4) is a condition for specifying a ratio of an absolute value of the focal length of the third lens group to the focal length of the entire system. When the ratio exceeds the upper limit of condition (4), the overall optical length at the telephoto end becomes too long as a moving distance of second lens group G2 increases on zooming. This makes it difficult to offer a compact zoom lens system. On the other hand, when the ratio exceeds the lower limit of condition (4), it becomes difficult to correct aberrations over the entire system, resulting in inability to secure desired optical performance.

The above advantage can be further enhanced by preferably satisfying condition (4a) or condition (4b).

$$5.70 < |f3|/fw \quad (4a)$$

$$|f3|/fw < 7.00 \quad (4b)$$

The above advantage can be still further enhanced by further preferably satisfying condition (4c) or condition (4d).

$$5.90 < |f3|/fw \quad (4c)$$

$$|f3|/fw < 6.80 \quad (4d)$$

Still more, for example, the subsequent lens group preferably includes, in order from the object side to the image side, fourth lens group G4 with positive optical power, fifth lens group G5 with positive optical power, and sixth lens group g6 with negative optical power.

This enables to configure a zoom lens system having good optical performance from the wide-angle end to the telephoto end.

Still more, for example, the subsequent lens group preferably includes, in order from the object side to the image side, fourth lens group G4 with positive optical power and fifth lens group G5 with positive optical power.

This enables to configure a zoom lens system having good optical performance from the wide-angle end to the telephoto end, and also achieve a simpler zoom lens system.

Still more, for example, the zoom lens system preferably satisfies condition (5) below.

$$35 < vdCG1\ max < 80 \quad (5)$$

Where vdG1 max: Largest Abbe number in the lens elements of first lens group G1 and second lens group G2

Condition (5) is a condition for specifying the largest Abbe number in the lens elements of first lens group G1 and second lens group G2. When the value exceeds the upper limit of condition (5), the overall optical length becomes too long to offer a compact zoom lens system. On the other hand, when the value exceeds the lower limit of condition (5), aberrations, in particular chromatic aberration, cannot be satisfactorily corrected.

The above advantage can be further enhanced by preferably satisfying condition (5a) or condition (5b).

$$40 < vdG1\ \text{max} \tag{5a}$$

$$vdG1\ \text{max} < 67 \tag{5b}$$

The above advantage can be still further enhanced by further preferably satisfying condition (5c) or condition (5d).

$$47 < vdG1\ \text{max} \tag{5c}$$

$$vdG1\ \text{max} < 59 \tag{5d}$$

Furthermore, for example, the zoom lens system preferably satisfies condition (6) below.

$$1.5 < ndG12\ \text{min} < 1.85 \tag{6}$$

Where
ndG12 min: Smallest refractive index at d-line in the lens elements of first lens group g1 and second lens group G2.

Condition (6) is a condition for specifying the smallest refractive index at d-line in the lens elements of first lens group G1 and second lens group G2. When the value exceeds the upper limit of condition (6), optical power of first lens group G1 and second lens group G2 in the entire zoom lens system becomes too strong. This makes it difficult to satisfactorily remove aberrations, in particular axial chromatic aberration. On the other hand, when the value exceeds the lower limit of condition (6), optical power of first lens group G1 and second lens group G2 in the entire zoom lens system becomes too weak to offer a compact zoom lens system.

The above advantage can be further enhanced by preferably satisfying condition (6a) or condition (6b).

$$1.55 < ndG12\ \text{min} \tag{6a}$$

$$ndG12\ \text{min} < 1.80 \tag{6b}$$

The above advantage can be still further enhanced by further preferably satisfying condition (6c) or condition (6d).

$$1.67 < ndG12\ \text{min} \tag{6c}$$

$$ndG12\ \text{min} < 1.75 \tag{6d}$$

Schematic Diagram of Imaging Apparatus Employing the First Exemplary Embodiment

Figure 13:
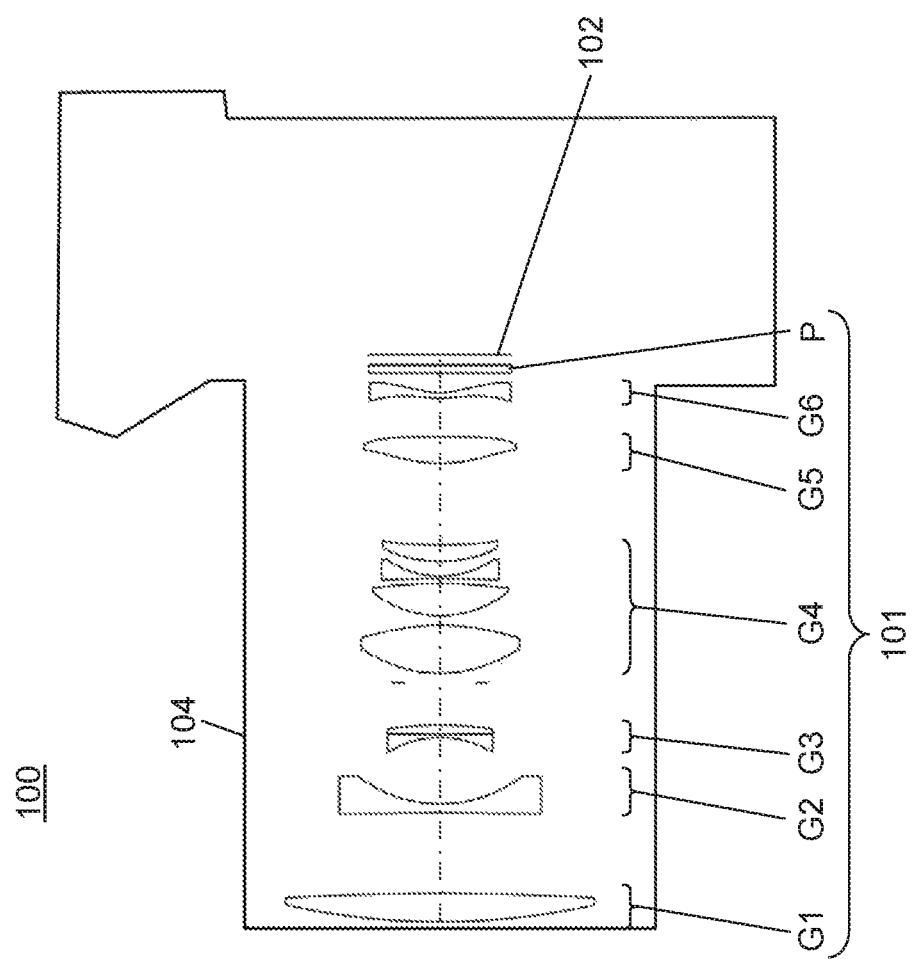
FIG. 13 is a schematic block diagram of an imaging apparatus employing the zoom lens system in accordance with the first exemplary embodiment.

FIG. 13 is a schematic diagram of the imaging apparatus employing the zoom lens system in the first exemplary embodiment. The zoom lens systems in the second, third, and fourth exemplary embodiments are also applicable to the imaging apparatus.

Imaging apparatus 100 includes casing 104, image sensor 102, and zoom lens system 101. A specific example of imaging apparatus 100 is a digital camera.

Zoom lens system 101 has a lens barrel 302 (shown in FIG. 14) for holding first lens group G1, second lens group G2, third lens group G3, aperture stop A, fourth lens group G4, fifth lens group G5, and sixth lens group G6.

Zoom lens system 101 includes an actuator and lens frame in casing 104 for moving first lens group G1, second lens group G2, third lens group G3, aperture stop A, fourth lens group G4, and fifth lens group G5 when zooming.

This achieves a compact imaging apparatus with good aberrations over the entire zoom range.

As described above, the example of applying the zoom lens system in the first exemplary embodiment to a digital camera is given here, but the zoom lens system is also applicable to other devices, such as smartphones.

Schematic Diagram of Camera Employing the First Exemplary Embodiment

Figure 14:
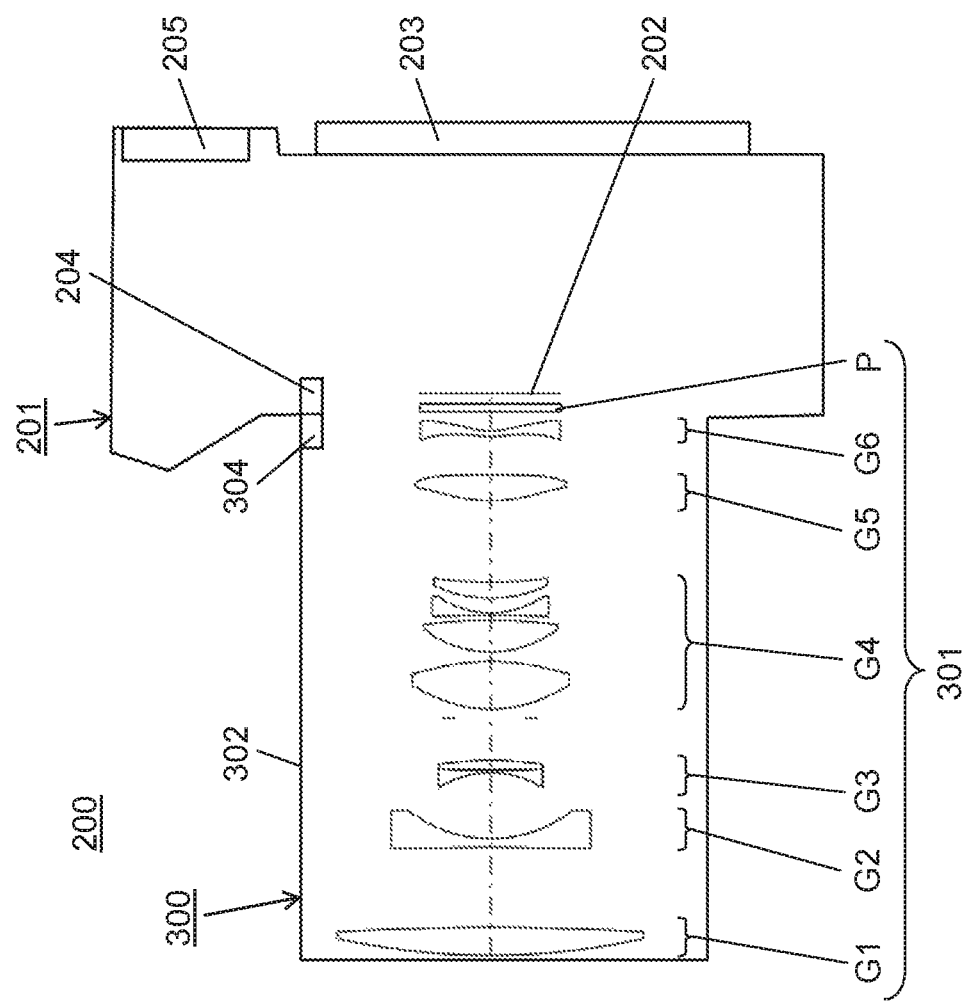
FIG. 14 is a schematic block diagram of a camera employing the zoom lens system in accordance with the first exemplary embodiment.

FIG. 14 is a schematic diagram of a camera employing the zoom lens system in the first exemplary embodiment. The zoom lens systems in the second, third, and fourth exemplary embodiment are also applicable to the camera.

Camera 200 includes camera body 201 and interchangeable lens device 300 detachably connected to camera body 201.

Camera body 201 includes image sensor 202 for receiving an optical image formed by the zoom lens system of interchangeable lens device 300 and converting the optical image to an electric image signal, monitor 203 for displaying the image signal converted by image sensor 202, a memory (not illustrated) for storing the image signal, camera mount 204, and finder 205.

Interchangeable lens device 300 includes lens barrel 302 holding first lens group G1, second lens group G2, third lens group G3, aperture stop A, fourth lens group G4, fifth lens group G5, and sixth lens group G6; and lens mount 304 connected to camera mount 2004 of camera body 201.

Camera mount 204 and lens mount 304 electrically connect a controller (not illustrated) inside camera body 201 and a controller (not illustrated) inside interchangeable lens device 300, in addition to physical connection, so as to function as an interface that allows mutual signal communication.

Zoom lens system 301 includes lens groups held by lens barrel 302 and parallel flat plate P of camera body 201. Zoom lens system 301 also includes an actuator controlled by the controller inside the interchangeable lens device 300 so as to move first lens group G1, second lens group G2, third lens group G3, aperture stop A, fourth lens group G4, and fifth lens group G5; and a lens frame.

This enables to achieve a compact camera with good aberrations over the entire zoom range.

Numerical Practical Examples

Numerical practical examples of the zoom lens systems in the first to fourth exemplary embodiments are given below. In all numerical practical examples, the unit of lengths is mm, and the unit of view angles is ° in all the tables. In addition, in all the numerical practical examples, r is a curvature radius; d, a surface distance; nd, a refractive index at d-line; and vd, an Abbe number at d-line. Still more, in all the numerical practical examples, a surface with an * mark is aspheric and its aspheric shape is defined by the following expression.

$$Z = \frac{h^2/r}{1 + \sqrt{1 - (1+\kappa)(h/r)^2}} + \sum A_n h^n$$

Where
Z: Distance from a point on an aspheric surface with height h from the optical axis to the tangent plane at the apex of the aspheric surface
h: Height from the optical axis
r: Curvature radius at the apex
κ: Conic constant
An: n-degree aspherical coefficient Furthermore, in all the numerical practical examples, an aperture stop diameter is a valid aperture stop diameter at each zoom position.

FIGS. 2, 5, 8, and 11 are longitudinal aberration diagrams of the zoom lens systems in the infinity focusing state in accordance with the first to fourth exemplary embodiments.

In each longitudinal aberration diagram, part (a) shows aberration at the wide-angle end; part (b), at an middle position; and part (c), at the telephoto end. Each longitudinal aberration diagram shows spherical aberration (SA (mm)), astigmatism (AST (mm)), and distortion aberration (DIS (%)), in order from the left. In a spherical aberration diagram, the vertical axis represents F number (shown by F in the diagram). A solid line represents the characteristics of d-line; a short broken line, of F-line; and a long broken line, of C-line. In an astigmatism diagram, the vertical axis represents the image height (shown by H in the diagram). A solid line represents the characteristics of the sagittal plane (shown by s in the diagram); and a broken line, of the meridional plane (shown by m in the diagram). In a distortion aberration diagram, the vertical axis represents the image height (shown by H in the diagram).

FIGS. 3, 6, 9, and 12 are lateral aberration diagrams of the zoom lens systems at the telephoto end in accordance with the first to fourth exemplary embodiments.

In each lateral aberration diagram, the three aberration diagrams correspond to a basic state at the telephoto end. In each lateral aberration diagram, the horizontal axis represents the distance from the main light beam on the pupil surface. A solid line shows the characteristics of d-line; a short broken line, of F-line; and a long broken line, of C-line. In each lateral aberration diagram, a meridional plane is defined as a surface containing the optical axis of first lens group G1 and the optical axis of second lens group G2 (first to fourth exemplary embodiments)

Numerical Practical Example 1

The zoom lens system in numerical practical example 1 corresponds to the first exemplary embodiment shown in FIG. 1. Table 1 shows surface data and Table 2 shows aspheric surface data of the zoom lens system in numerical practical example 1. Tables 3A to 3D show various data in the infinity focusing state.

TABLE 1

Surface data
Unit: mm

| Surface No. | r | d | nd | vd |
|---|---|---|---|---|
| Object surface | ∞ | | | |
| 1 | 79.88540 | 3.23920 | 1.72916 | 54.7 |
| 2 | −310.84730 | variable | | |
| 3* | −103.60610 | 1.00000 | 1.80500 | 40.9 |
| 4* | 16.33010 | variable | | |
| 5 | −11.11660 | 0.30000 | 1.51680 | 64.2 |
| 6 | 157.67760 | 0.00500 | 1.56732 | 42.8 |
| 7 | 157.67760 | 1.09940 | 2.00272 | 19.3 |
| 8 | −40.99440 | variable | | |
| 9 (aperture) | ∞ | variable | | |
| 10* | 14.71570 | 5.50660 | 1.55332 | 71.5 |
| 11* | −22.47600 | 1.10000 | | |
| 12 | 12.55240 | 3.67350 | 1.43700 | 95.1 |
| 13 | −55.90080 | 0.54230 | | |
| 14 | −241.95180 | 0.30340 | 1.80518 | 25.5 |
| 15 | 10.76300 | 1.69950 | | |
| 16* | 16.15450 | 1.86500 | 1.58575 | 59.5 |
| 17* | 65.59300 | variable | | |

TABLE 1-continued

Surface data
Unit: mm

| Surface No. | r | d | nd | vd |
|---|---|---|---|---|
| 18* | 16.85020 | 3.01700 | 1.68893 | 31.2 |
| 19* | −604.72290 | variable | | |
| 20* | 11.44580 | 0.62950 | 1.63550 | 23.9 |
| 21* | 7.07090 | 2.24590 | | |
| 22 | ∞ | 0.90000 | 1.51680 | 64.2 |
| 23 | ∞ | BF | | |
| Image surface | ∞ | | | |

TABLE 2

Aspheric Surface Data

Third surface

K = 0.00000E+00, A4 = 7.77033E−05, A6 = −7.35181E−07,
A8 = 3.87064E−09, A10 = −8.52922E−12, A12 = 0.00000E+00

Fourth surface

K = −2.89966E−01, A4 = 8.45198E−05, A6 = −6.27824E−07,
A8 = 1.11137E−09, A10 = 1.09638E−12, A12 = 0.00000E+00

Tenth surface

K = 0.00000E+00, A4 = −4.40239E−05, A6 = 1.59110E−07,
A8 = −3.40443E−09, A10 = 7.92136E−12, A12 = 0.00000E+00

Eleventh surface

K = 0.00000E+00, A4 = 8.46482E−05, A6 = −5.88157E−08,
A8 = −2.37390E−09, A10 = 1.05185E−11, A12 = 0.00000E+00

Sixteenth surface

K = 0.00000E+00, A4 = 4.71339E−05, A6 = 2.53489E−07,
A8 = 8.35339E−09, A10 = 0.00000E+00, A12 = 0.00000E+00

Seventeenth surface

K = 0.00000E+00, A4 = 1.77648E−05, A6 = 1.02776E−06,
A8 = 1.89649E−08, A10 = 0.00000E+00, A12 = 0.00000E+00

Eighteenth surface

K = 9.20138E−01, A4 = −1.02721E−04, A6 = −5.90975E−07,
A8 = −1.21339E−08, A10 = 6.23190E−11, A12 = 3109857E−18

Nineteenth surface

K = 4.80000E+01, A4 = −6.65169E−05, A6 = −8.58466E−07,
A8 = −3.71722E−09, A10 = 3.38607E−11, A12 = −9.91875E−21

Twentieth surface

K = −1.14235E+01, A4 = −1.78123E−03, A6 = 4.78222E−05,
A8 = − 6.12350E−07, A10 = 2.80767E−09, A12 = 4.44282E−22

Twenty-first surface

K = −3.31984E+00, A4 = −1.86116E−03, A6 = 5.41771E−05,
A8 = −7.00773E−07, A10 = 3.03657E−09, A12 = 3.54478E−22

(Various Data in Infinity Focusing State)

TABLE 3A

Various Data
Zoom ratio: 2.74524

| | Wide-angle end | Middle position | Telephoto end |
|---|---|---|---|
| Focal length | 9.1916 | 15.2287 | 25.2331 |
| F number | 1.47847 | 2.90252 | 2.93969 |
| View angle | 40.7594 | 27.4620 | 17.4304 |
| Image height | 6.6090 | 7.3650 | 7.7300 |
| Total lens length | 64.4839 | 65.1766 | 76.4755 |
| BF | 1.38409 | 1.41488 | 1.37695 |
| d2 | 1.0347 | 9.2715 | 21.2145 |
| d4 | 13.5670 | 7.6199 | 4.8916 |

TABLE 3A-continued

Various Data
Zoom ratio: 2.74524

| | Wide-angle end | Middle position | Telephoto end |
|---|---|---|---|
| d8 | 10.4299 | 4.8803 | 1.0400 |
| d9 | 1.2800 | 1.0600 | 1.0600 |
| d17 | 8.6539 | 9.3733 | 12.2839 |
| d19 | 1.0080 | 4.4304 | 7.4822 |
| Entrance pupil position | 15.4642 | 23.9648 | 41.5732 |
| Exit pupil position | −27.2500 | −28.0301 | −32.5009 |
| Front principal point | 21.7052 | 31.3173 | 48.0120 |
| Rear principal point | 55.2923 | 49.9478 | 51.2424 |
| Aperture stop diameter | 7.691 | 4.037 | 4.281 |

TABLE 3B

Data of Single Lens

| Lens | First surface | Focal length |
|---|---|---|
| 1 | 1 | 87.4647 |
| 2 | 3 | −17.4589 |
| 3 | 5 | −20.0817 |
| 4 | 7 | 32.5373 |
| 5 | 10 | 16.9672 |
| 6 | 12 | 23.8459 |
| 7 | 14 | −12.7910 |
| 8 | 16 | 36.0881 |
| 9 | 18 | 23.8427 |
| 10 | 20 | −30.8336 |

TABLE 3C

Data of Zoom Lens groups

| Group | First surface | Focal length | Lens configuration length | Front principal point | Rear principal point |
|---|---|---|---|---|---|
| 1 | 1 | 87.46467 | 3.23920 | 0.38434 | 1.74369 |
| 2 | 3 | −17.45887 | 1.00000 | 0.47681 | 0.92485 |
| 3 | 5 | −55.22600 | 1.40440 | −1.04671 | −0.42660 |
| 4 | 10 | 15.75146 | 14.69030 | −0.15224 | 4.45295 |
| 5 | 18 | 23.84267 | 3.01700 | 0.04852 | 1.27564 |
| 6 | 20 | −30.8336 | 3.77540 | 1.06662 | 1.59507 |

TABLE 3D

Magnification of Zoom Lens Groups

| Group | First surface | Wide-angle end | Middle position | Telephoto end |
|---|---|---|---|---|
| 1 | 1 | 0.00000 | 0.00000 | 0.00000 |
| 2 | 3 | −0.26058 | −0.29711 | −0.37290 |
| 3 | 5 | 0.61478 | 0.65340 | 0.66445 |
| 4 | 10 | −0.83292 | −1.43082 | −2.40173 |
| 5 | 18 | 0.70595 | 0.56137 | 0.43465 |
| 6 | 20 | 1.11560 | 1.11660 | 1.11537 |

Numerical Practical Example 2

The zoom lens system of numerical practical example 2 corresponds to the second exemplary embodiment shown in FIG. 4. Table 4 shows surface data and Table 5 shows aspheric surface data of the zoom lens system in numerical practical example 2. Tables 6A to 6D show various data in the infinity focusing state.

TABLE 4

Surface Data
Unit: mm

| Surface No. | r | d | nd | vd |
|---|---|---|---|---|
| Object surface | ∞ | | | |
| 1 | 69.96770 | 3.59730 | 1.72916 | 54.7 |
| 2 | −469.52430 | variable | | |
| 3* | −68.74170 | 1.00000 | 1.80500 | 40.9 |
| 4* | 16.05730 | variable | | |
| 5 | −10.69370 | 0.30000 | 1.51680 | 64.2 |
| 6 | 151.25060 | 0.00500 | 1.56732 | 42.8 |
| 7 | 151.25060 | 1.12090 | 2.00272 | 19.3 |
| 8 | −35.73310 | variable | | |
| 9 (aperture) | ∞ | variable | | |
| 10* | 14.39920 | 5.63820 | 1.55332 | 71.5 |
| 11* | −21.87340 | 1.15370 | | |
| 12 | 12.40200 | 3.70500 | 1.43700 | 95.1 |
| 13 | −62.96640 | 0.50000 | | |
| 14 | −490.51060 | 0.30000 | 1.84666 | 23.8 |
| 15 | 10.52050 | 1.64820 | | |
| 16* | 14.89680 | 1.94460 | 1.58575 | 59.5 |
| 17* | 78.47350 | variable | | |
| 18* | 18.23540 | 2.77170 | 1.63550 | 23.9 |
| 19* | −313.06430 | variable | | |
| 20* | 10.36790 | 0.58000 | 1.63550 | 23.9 |
| 21* | 6.72880 | 1.99740 | | |
| 22 | ∞ | 0.90000 | 1.51680 | 64.2 |
| 23 | ∞ | BF | | |
| Image surface | ∞ | | | |

TABLE 5

Aspheric Surface Data

Third surface

K = 0.00000E+00, A4 = 1.10992E−04, A6 = −1.09076E−06, A8 = 5.96665E−09, A10 = −1.30660E−11, A12 = 0.00000E+00

Fourth surface

K = −1.00747E+00, A4 = 1.28912E−04, A6 = −3.94624E−07, A8 = −6.87567E−09, A10 = 6.27088E−11, A12 = 0.00000E+00

Tenth surface

K = 0.00000E+00, A4 = −4.67657E−05, A6 = 1.01742E−07, A8 = −2.51862E−09, A10 = 3.20717E−12, A12 = 0.00000E+00

Eleventh surface

K = 0.00000E+00, A4 = 8.54964E−05, A6 = −7.75777E−08, A8 = −1.81776E−09, A10 = 7.63047E−12, A12 = 0.00000E+00

Sixteenth surface

K = 0.00000E+00, A4 = 5.89949E−05, A6 = −4.47785E−07, A8 = 1.82654E−08, A10 = 0.00000E+00, A12 = 0.00000E+00

Seventeenth surface

K = 0.00000E+00, A4 = 4.44027E−05, A6 = 1.55927E−07, A8 = 3.00317E−08, A10 = 0.00000E+00, A12 = 0.00000E+00

Eighteenth surface

K = −2.65366E−02, A4 = −7.82264E−05, A6 = −8.63165E−07, A8 = −1.30403E−08, A10 = 8.88161E−11, A12 = 4.02067E−19

Nineteenth surface

K = −4.80000E+01, A4 = −6.58926E−05, A6 = −1.39279E−06, A8 = −1.87165E−09, A10 = 2.66627E−11, A12 = −1.31280E−20

Twentieth surface

K = −1.90001E+01, A4 = −1.78892E−03, A6 = 4.94312E−05, A8 = −6.54240E−07, A10 = 2.99304E−09, A12 = −1.49374E−22

Twenty-first surface

K = −6.42940E+00, A4 = −1.64267E−03, A6 = 5.04913E−05, A8 = −6.96189E−07, A10 = 3.17264E−09, A12 = 5.15390E−21

(Various Data in Infinity Focusing State)

TABLE 6A

Various Data
Zoom ratio: 2.74526

|  | Wide-angle end | Middle position | Telephoto end |
|---|---|---|---|
| Focal length | 9.1916 | 15.2294 | 25.2334 |
| F number | 1.47835 | 2.90263 | 2.93935 |
| View angle | 40.7514 | 27.4565 | 17.422.7 |
| Image height | 6.6250 | 7.3700 | 7.7640 |
| Total lens length | 64.2098 | 65.4020 | 76.4899 |
| BF | 1.38970 | 1.42014 | 1.39289 |
| d2 | 1.2064 | 9.1203 | 20.6916 |
| d4 | 14.0381 | 8.0399 | 5.6507 |
| d8 | 9.4153 | 4.7055 | 1.0400 |
| d9 | 1.2800 | 1.0600 | 1.0600 |
| d17 | 8.4534 | 9.3286 | 11.9184 |
| d19 | 1.2649 | 4.5656 | 7.5743 |
| Entrance pupil position | 15.4592 | 24.1217 | 42.4324 |
| Exit pupil position | −25.1540 | −26.0981 | −29.2572 |
| Front principal point | 21.4679 | 30.9227 | 46.8918 |
| Rear principal point | 55.0182 | 50.1726 | 51.2565 |
| Aperture stop diameter | 7.777 | 4.144 | 4.450 |

TABLE 6B

Data of Single Lens

| Lens | First surface | Focal length |
|---|---|---|
| 1 | 1 | 83.7473 |
| 2 | 3 | −16.0853 |
| 3 | 5 | −19.3136 |
| 4 | 1 | 28.9127 |
| 5 | 10 | 16.6126 |
| 6 | 12 | 24.0697 |
| 7 | 14 | −12.1616 |
| 8 | 16 | 31.0403 |
| 9 | 18 | 27.2036 |
| 10 | 20 | −32.1576 |

TABLE 6C

Data of Zoom Lens Groups

| Group | First surface | Focal length | Lens configuration length | Front principal point | Rear principal point |
|---|---|---|---|---|---|
| 1 | 1 | 83.74725 | 3.59730 | 0.27057 | 1.78163 |
| 2 | 3 | −16.08526 | 1.00000 | 0.44676 | 0.89564 |
| 3 | 5 | −62.33850 | 1.42590 | −1.37019 | −0.75247 |
| 4 | 10 | 15.48447 | 14.88970 | 0.09177 | 4.63187 |
| 5 | 18 | 27.20360 | 2.77170 | 0.09358 | 1.16505 |
| 6 | 20 | −32.15759 | 3.47740 | 1.07706 | 1.58566 |

TABLE 6D

Magnification of Zoom Lens Groups

| Group | First surface | Wide-angle end | Middle position | Telephoto end |
|---|---|---|---|---|
| 1 | 1 | 0.00000 | 0.00000 | 0.00000 |
| 2 | 3 | −0.25058 | −0.28581 | −0.35979 |
| 3 | 5 | 0.65463 | 0.69423 | 0.70363 |
| 4 | 10 | −0.81452 | −1.33344 | −2.10356 |
| 5 | 18 | 0.74539 | 0.62314 | 0.51336 |
| 6 | 20 | 1.10204 | 1.10299 | 1.10214 |

Numerical Practical Example 8

The zoom lens system of numerical practical example 3 corresponds to the third exemplary embodiment shown in FIG. 7. Table 7 shows surface data and Table 8 shows aspheric surface data of the zoom lens system in numerical practical example 3. Tables 9A to 9D show various data in the infinity focusing state.

TABLE 7

Surface Data
Unit: mm

| Surface No. | R | d | nd | vd |
|---|---|---|---|---|
| Object surface | ∞ |  |  |  |
| 1 | 119.50080 | 2.95220 | 1.72916 | 54.7 |
| 2 | −186.00820 | variable |  |  |
| 3* | −98.99640 | 1.00000 | 1.80500 | 40.9 |
| 4* | 18.51430 | variable |  |  |
| 5 | −10.71380 | 0.30000 | 1.51680 | 64.2 |
| 6 | 244.22100 | 0.00500 | 1.56732 | 42.8 |
| 7 | 244.22100 | 1.04950 | 2.00272 | 19.3 |
| 8 | −37.05170 | variable |  |  |
| 9 (aperture) | ∞ | variable |  |  |
| 10* | 14.74650 | 5.51440 | 1.55332 | 71.5 |
| 11* | −22.84040 | 1.26320 |  |  |
| 12 | 12.51260 | 3.82020 | 1.43700 | 95.1 |
| 13 | −75.83910 | 0.52730 |  |  |
| 14 | 382.09700 | 0.34750 | 1.84666 | 23.8 |
| 15 | 10.61150 | 1.47000 |  |  |
| 16* | 15.43420 | 2.18530 | 1.58575 | 59.5 |
| 17* | 84.01210 | variable |  |  |
| 18* | 16.29670 | 2.75130 | 1.63550 | 23.9 |
| 19* | 275.17180 | variable |  |  |
| 20* | 11.35470 | 0.58000 | 1.63550 | 23.9 |
| 21* | 6.89190 | 2.17830 |  |  |
| 22 | ∞ | 0.90000 | 1.51680 | 64.2 |
| 23 | ∞ | BF |  |  |
| Image surface | ∞ |  |  |  |

TABLE 8

Aspheric Surface Data

Third surface

K = 0.00000E+00, A4 = 9.23630E−05, A6 = −8.24430E−07,
A8 = 3.54750E−09, A10 = −5.98128E−12, A12 = 0.00000E+00

Fourth surface

K = −1.30883E+00, A4 = 1.16597E−04, A6 = −4.78860E−07,
A8 = −3.78603E−09, A10 = 2.47111E−11, A12 = 0.00000E+00

Tenth surface

K = 0.00000E+00, A4 = −4.52497E−05, A6 = 1.53233E−07,
A8 = −2.92564E−09, A10 = 6.93609E−12, A12 = 0.00000E+00

Eleventh surface

K = 0.00000E+00, A4 = 8.03587E−05, A6 = −7.14482E−08,
A8 = −1.65512E−09, A10 = 7.36780E−12, A12 = 0.00000E+00

Sixteenth surface

K = 0.00000E+00, A4 = 6.68837E−05, A6 = −1.03225E−07,
A8 = 1.25868E−08, A10 = 0.00000E+00, A12 = 0.00000E+00

Seventeenth surface

K = 0.00000E+00, A4 = 5.17744E−05, A6 = 5.15309E−07,
A8 = 2.64642E−08, A10 = 0.00000E+00, A12 = 0.00000E+00

Eighteenth surface

K = − −3.69640E−01, A4 = −6.91874E−05, A6 = −1.22432E−06,
A8 = −1.06864E−08, A10 = 3.93438E−11, A12 = 4.03249E−19

TABLE 8-continued

Aspheric Surface Data

Nineteenth surface

K = −4.80000E+01, A4 = −6.15781E−05, A6 = −2.15667E−06,
A8 = 5.93216E−09, A10 = −3.99169E−11, A12 = −1.48595E−20
Twentieth surface K = −1.90000E+01, A4 = −1.65466E−03, A6 = 4.72767E−05,
A8 = −6.48132E−07, A10 = 3.05812E−09, A12 = −9.44119E−23
Twenty-first surface K = −5.48780E+00, A4 = −1.52945E−03, A6 = 4.99629E−05,
A8 = −7.24929E−07, A10 = 3.41515E−09, A12 = 5.19749E−21

(Various Data in Infinity Focusing State)

TABLE 9A

Various Data
Zoom ratio: 2.74524

|  | Wide-angle end | Middle position | Telephoto end |
|---|---|---|---|
| Focal length | 9.1916 | 15.2295 | 25.23333 |
| F number | 1.48057 | 2.90325 | 2.94614 |
| View angle | 40.7617 | 27.4636 | 17.4263 |
| Image height | 6.6220 | 7.3740 | 7.7150 |
| Total lens length | 64.4802 | 65.3714 | 76.4797 |
| BF | 1.38054 | 1.41150 | 1.38017 |
| d2 | 0.4144 | 9.7595 | 22.0933 |
| d4 | 15.3725 | 8.7803 | 5.6566 |
| d8 | 10.3416 | 4.9164 | 1.0400 |
| d9 | 1.2800 | 1.0600 | 1.0600 |
| d17 | 8.1242 | 8.7339 | 11.8248 |
| d19 | 0.7228 | 3.8656 | 6.5806 |
| Entrance pupil position | 15.1991 | 24.5987 | 41.3872 |
| Exit pupil position | −23.2499 | −23.8247 | −27.0182 |
| Front principal point | 20.9606 | 30.6375 | 44.1998 |
| Rear principal point | 55.2886 | 50.1419 | 51.2464 |
| Aperature stop diameter | 7.776 | 4.129 | 4.496 |

TABLE 9B

Data of Single Lens

| Lens | First surface | Focal length |
|---|---|---|
| 1 | 1 | 100.1911 |
| 2 | 3 | −19.3023 |
| 3 | 5 | −19.8519 |
| 4 | 7 | 32.1436 |
| 5 | 10 | 17.0880 |
| 6 | 12 | 24.9053 |
| 7 | 14 | −12.8969 |
| 8 | 16 | 31.9042 |
| 9 | 18 | 27.1461 |
| 10 | 20 | −29.0601 |

TABLE 9C

Data of Zoom Lens Groups

| Group | First surface | Focal length | Lens configuration length | Front principal point | Rear principal point |
|---|---|---|---|---|---|
| 1 | 1 | 100.19112 | 2.95220 | 0.67055 | 1.90846 |
| 2 | 3 | −19.30226 | 1.00000 | 0.46496 | 0.91304 |
| 3 | 5 | −54.80352 | 1.35450 | −1.09686 | −0.50437 |
| 4 | 10 | 15.49002 | 15.12790 | 0.02996 | 4.79124 |

TABLE 9C-continued

Data of Zoom Lens Groups

| Group | First surface | Focal length | Lens configuration length | Front principal point | Rear principal point |
|---|---|---|---|---|---|
| 5 | 18 | 27.14613 | 2.75130 | −0.10546 | 0.97052 |
| 6 | 20 | −29.06005 | 3.65830 | 0.95028 | 1.46343 |

TABLE 9D

Magnification of Zoom Lens Groups

| Group | First surface | Wide-angle end | Middle position | Telephoto end |
|---|---|---|---|---|
| 1 | 1 | 0.00000 | 0.00000 | 0.00000 |
| 2 | 3 | −0.24444 | −0.27725 | −0.33694 |
| 3 | 5 | 0.58811 | 0.62828 | 0.64281 |
| 4 | 10 | −0.75217 | −1.21522 | −1.91849 |
| 5 | 18 | 0.75549 | 0.63881 | 0.53971 |
| 6 | 20 | 1.12304 | 1.12410 | 1.12302 |

Numerical Practical Example 4

The zoom lens system of numerical practical example 4 corresponds to the fourth exemplary embodiment shown in FIG. 10. Table 10 shows surface data and Table 11 shows aspheric surface data of the zoom lens system in numerical practical example 4. Tables 12A to 12D show various data in the infinity focusing state.

TABLE 10

Surface Data
Unit: mm

| Surface No. | r | d | nd | vd |
|---|---|---|---|---|
| Object surface | ∞ |  |  |  |
| 1 | 74.31340 | 2.47090 | 1.72916 | 54.7 |
| 2 | −379.08180 | variable |  |  |
| 3* | −72.03970 | 1.00000 | 1.80500 | 40.9 |
| 4* | 16.44050 | variable |  |  |
| 5 | −10.27940 | 0.30000 | 1.51680 | 64.2 |
| 6 | 104.24700 | 0.00500 | 1.56732 | 42.8 |
| 7 | 104.24700 | 2.21990 | 2.00272 | 19.3 |
| 8 | −36.71820 | variable |  |  |
| 9 (aperture) | ∞ | variable |  |  |
| 10* | 14.66950 | 5.41270 | 1.55332 | 71.5 |
| 11* | −23.18260 | 1.36050 |  |  |
| 12 | 12.52190 | 3.60890 | 1.43700 | 95.1 |
| 13 | −64.66570 | 0.50000 |  |  |
| 14 | 290.24700 | 0.30000 | 1.84666 | 23.8 |
| 15 | 10.02630 | 1.81130 |  |  |
| 16* | 15.41930 | 2.58750 | 1.58575 | 59.5 |
| 17* | 84.22470 | variable |  |  |
| 18* | 37.88250 | 2.59850 | 1.68893 | 31.2 |
| 19* | −24.68240 | 2.60340 |  |  |
| 20* | 21.01830 | 0.58000 | 1.69680 | 55.5 |
| 21* | 9.60780 | variable |  |  |
| 22 | ∞ | 0.90000 | 1.51680 | 64.2 |
| 23 | ∞ | BF |  |  |
| Image surface | ∞ |  |  |  |

TABLE 11

Aspheric Surface Data

Third surface

K = 0.00000E+00, A4 = 5.52895E−05, A6 = −2.54094E−07,
A8 = 6.97175E−10, A10 = −8.67076E−13, A12 = 0.00000E+00
Fourth surface K = −1.15288E−01, A4 = 3.34313E−05, A6 = −1.07505E−07,
A8 = 4.09875E−10, A10 = −1.69993E−11, A12 = 0.00000E+00
Tenth surface K = 0.00000E+00, A4 = −5.45223E−05, A6 = 4.08952E−08,
A8 = − 9.03260E−10, A10 = −3.31735E−12, A12 = 0.00000E+00
Eleventh surface K = 0.00000E+00, A4 = 6.94038E−05, A6 = −6.85222E−08,
A8 = −2.99267E−10, A10 = −6.86420E−13, A12 = 0.00000E+00
Sixteenth surface K = 0.00000E+00, A4 = 5.71127E−05, A6 = 1.13527E−07,
A8 = 1.07656E−08, A10 = 0.00000E+00, A12 = 0.00000E+00
Seventeenth surface K = 0.00000E+00, A4 = 7.40379E−05, A6 = 2.54552E−07,
A8 = 2.03115E−08, A10 = 0.00000E+00, A12 = 0.00000E+00
Eighteenth surface K = 6.03182E+00, A4 = 4.65010E−05, A6 = 1.15539E−06,
A8 = −7.09617E−08, A10 = 3.39497E−10, A12 = 3.99672E−19
Nineteenth surface K = −8.25940E+00, A4 = 1.24985E−04, A6 = −2.58047E−06,
A8 = −4.73060E−08, A10 = 4.86309E−10, A12 = −1.09729E−20
Twentieth surface K = −1.31885E+01, A4 = −1.98818E−03, A6 = 4.15475E−05,
A8 = −5.65801E−07, A10 = 4.18748E−09, A12 = −4.70055E−22
Twenty-first surface K = −4.18436E+00, A4 = −1.99607E−03, A6 = 4.75180E−05,
A8 = −6.23475E−07, A10 = 3.91360E−09, A12 = 3.83457E−21

(Various Data in Infinity Focusing State)

TABLE 12A

Various Data
Zoom ratio: 2.74522

| | Wide-angle end | Middle position | Telephoto end |
|---|---|---|---|
| Focal length | 9.1915 | 15.2290 | 25.2328 |
| F number | 1.48116 | 2.90757 | 2.94907 |
| View angle | 40.7489 | 27.4742 | 17.4310 |
| Image height | 6.6230 | 7.4800 | 7.7920 |
| Total lens length | 64.4919 | 67.1519 | 76.4746 |
| BF | 1.39231 | 1.39703 | 1.37458 |
| d2 | 1.4771 | 7.6650 | 15.3740 |
| d4 | 12.3498 | 9.4834 | 7.5045 |
| d8 | 10.2773 | 4.7667 | 1.0400 |
| d9 | 1.2800 | 1.0600 | 1.0600 |
| d17 | 7.9575 | 10.0834 | 13.8166 |
| d21 | 1.4993 | 4.4378 | 8.0463 |
| Entrance pupil position | 14.8557 | 21.6355 | 32.0025 |
| Exit pupil position | −26.5236 | −32.0530 | −41.3261 |
| Front principal point | 21.0208 | 29.9311 | 42.3247 |
| Rear principal point | 55.3004 | 51.9229 | 51.2418 |
| Aperture stop diameter | 7.724 | 4.576 | 5.461 |

TABLE 12B

Data of Single Lens

| Lens | First surface | Focal length |
|---|---|---|
| 1 | 1 | 85.4082 |
| 2 | 3 | −16.5448 |
| 3 | 5 | −18.0891 |
| 4 | 7 | 27.2954 |
| 5 | 10 | 17.1087 |
| 6 | 12 | 24.3519 |
| 7 | 14 | −12.2719 |
| 8 | 16 | 31.7818 |
| 9 | 18 | 22.0669 |
| 10 | 20 | −25.9400 |

TABLE 12C

Data of Zoom Lens Groups

| Group | First surface | Focal length | Lens configuration length | Front principal point | Rear Principal point |
|---|---|---|---|---|---|
| 1 | 1 | 85.40817 | 2.47090 | 0.23475 | 1.27340 |
| 2 | 3 | −16.54479 | 1.00000 | 0.44881 | 0.89757 |
| 3 | 5 | −60.22992 | 2.52490 | −2.20835 | −1.12567 |
| 4 | 10 | 16.12604 | 15.58090 | −0.05347 | 4.63849 |
| 5 | 18 | 73.98366 | 5.78190 | −10.07258 | −6.87862 |

TABLE 12D

Magnification of Zoom Lens Groups

| Group | First surface | Wide-angle end | Middle position | Telephoto end |
|---|---|---|---|---|
| 1 | 1 | 0.00000 | 0.00000 | 0.00000 |
| 2 | 3 | −0.25167 | −0.27782 | −0.31913 |
| 3 | 5 | 0.66054 | 0.67866 | 0.68871 |
| 4 | 10 | −0.82809 | −1.27456 | −1.93821 |
| 5 | 18 | 0.78177 | 0.74199 | 0.69352 |

Values Corresponding to Conditions

Table 13 below shows values corresponding to each condition.

TABLE 13

| | Numerical practical example 1 | Numerical practical example 2 | Numerical practical example 3 | Numerical practical example 4 |
|---|---|---|---|---|
| Condition (1) | 1.90 | 1.75 | 2.10 | 1.80 |
| Condition (2) | 1.805 | 1.805 | 1.805 | 1.805 |
| Condition (3) | 83.3 | 83.3 | 83.3 | 83.3 |
| Condition (4) | 6.01 | 6.78 | 5.96 | 6.55 |
| Condition (5) | 54.7 | 54.7 | 54.7 | 54.7 |
| Condition (6) | 1.72916 | 1.72916 | 1.72916 | 1.72916 |

The zoom lens system of the present disclosure is applicable typically to digital still cameras, digital cameras with interchangeable lens system, digital video cameras, cameras of mobile phones, cameras of PDAs (Personal Digital Assistances), monitoring cameras in monitoring systems, web cameras, and vehicle-mounted cameras. In particular, the present disclosure is suitable for imaging optical systems that require high picture quality, such as digital still camera systems and digital video camera systems.

What is claimed is:

1. A zoom lens system, in order from an object side to an image side, comprising:
   a first lens group having one first lens element with positive optical power;
   a second lens group having one second lens element with negative optical power;
   a third lens group with negative optical power; and
   a subsequent lens group including at least two lens groups, wherein a distance between the lens groups changes when zooming, and conditions (1) and (2) below are satisfied:

$$1.65 < |f2|/fw < 2.20 \tag{1}$$

$$5.50 < |f3|/fw < 7.20 \tag{2}$$

where
   f2 is a focal length of the second lens group,
   fw is a focal length of the zoom lens system at a wide-angle end, and
   f3 is a focal length of the third lens group.

2. The zoom lens system of claim 1, wherein condition (3) below is satisfied:

$$1.60 < nd2 < 2.10 \tag{3}$$

where
   nd2 is a refractive index at d-line of the second lens group.

3. The zoom lens system of claim 1, wherein condition (4) below is satisfied:

$$60 < (vda+vdb)/2 \tag{4}$$

where
   vda is a largest Abbe number in lens elements of the subsequent lens group, and
   vdb is a second largest Abbe number in the lens elements of the subsequent lens group.

4. The zoom lens system of claim 1, wherein the subsequent lens group, in order from the object side to the image side, includes:
   a fourth lens group with positive optical power,
   a fifth lens group with positive optical power, and
   a sixth lens group with negative optical power.

5. The zoom lens system of claim 1, wherein the subsequent lens group, in order from the object side to the image side, includes:
   a fourth lens group with positive optical power, and
   a fifth lens group with positive optical power.

6. The zoom lens system of claim 1, wherein condition (5) below is satisfied:

$$35 < vdG1\ max < 80 \tag{5}$$

where
   vdG1 max is a largest Abbe number in the lens elements of the first lens group and the second lens group.

7. The zoom lens system of claim 1, wherein condition (6) below is satisfied:

$$1.5 < ndG12\ min < 1.85 \tag{6}$$

where
   ndG12 min is a smallest refractive index at d-line in the lens elements of the first lens group and the second lens group.

8. An imaging apparatus comprising:
   a zoom lens system for forming an optical image of an object; and
   an image sensor for converting the optical image formed by the zoom lens system to an electric image signal,
   wherein the zoom lens system, in order from an object side to an image side, includes:
   a first lens group having one first lens element with positive optical power;
   a second lens group having one second lens element with negative optical power;
   a third lens group with negative optical power; and
   a subsequent lens group including at least two lens groups, and
   wherein a distance between the lens groups changes when zooming, and conditions (1) and (2) below are satisfied:

$$1.65 < |f2|/fw < 2.20 \tag{1}$$

$$5.50 < |f3|/fw < 7.20 \tag{2}$$

where
   f2 is a focal length of the second lens group,
   fw is a focal length of the zoom lens system at a wide-angle end, and
   where f3 is a focal length of the third lens group.

9. A camera comprising:
   a zoom lens system for forming an optical image of an object; and
   an image sensor for converting the optical image formed by the zoom lens system to an electric image signal,
   wherein the zoom lens system, in order from an object side to an image side, includes:
   a first lens group having one first lens element with positive optical power;
   a second lens group having one second lens element with negative optical power;
   a third lens group with negative optical power; and
   a subsequent lens group including at least two lens groups,
   wherein a distance between the lens groups changes when zooming, and conditions (1) and (2) below are satisfied:

$$1.65 < |f2|/fw < 2.20 \tag{1}$$

$$5.50 < |f3|/fw < 7.20 \tag{2}$$

where
   f2 is a focal length of the second lens group,
   fw is a focal length of the zoom lens system at a wide-angle end, and
   f3 is a focal length of the third lens group, and
   wherein the image signal converted by the image sensor is at least displayed or stored.

* * * * *